US010992824B2

(12) United States Patent
Hayashi

(10) Patent No.: US 10,992,824 B2
(45) Date of Patent: Apr. 27, 2021

(54) INFORMATION PROCESSING SYSTEM, PROCESSING EXECUTION METHOD, AND SERVICE PROVIDING SYSTEM

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/892,525

(22) Filed: Jun. 4, 2020

(65) Prior Publication Data

US 2020/0396343 A1 Dec. 17, 2020

(30) Foreign Application Priority Data

Jun. 11, 2019 (JP) ............................. JP2019-108934
Apr. 14, 2020 (JP) ............................. JP2020-072255

(51) Int. Cl.

| | |
|---|---|
| *G06F 15/00* | (2006.01) |
| *G06K 15/00* | (2006.01) |
| *G06K 1/00* | (2006.01) |
| *H04N 1/00* | (2006.01) |
| *G06F 3/0482* | (2013.01) |
| *G06F 3/0481* | (2013.01) |

(52) U.S. Cl.

CPC ....... *H04N 1/00079* (2013.01); *H04N 1/0009* (2013.01); *H04N 1/00037* (2013.01); *H04N 1/00413* (2013.01); *G06F 3/0482* (2013.01); *G06F 3/04817* (2013.01)

(58) Field of Classification Search

CPC ........... H04N 1/00079; H04N 1/00037; H04N 1/0009; H04N 1/00413; G06F 3/04817; G06F 3/0482

USPC ............................... 358/1.14, 1.15, 1.13, 1.1

See application file for complete search history.

(56) References Cited

U.S. PATENT DOCUMENTS

| | | | | |
|---|---|---|---|---|
| 10,120,758 | B2 * | 11/2018 | Hayashi | G06F 11/1469 |
| 2013/0307774 | A1 | 11/2013 | Hayashi et al. | |
| 2016/0117340 | A1 | 4/2016 | Hayashi | |
| 2016/0266977 | A1 | 9/2016 | Hayashi et al. | |
| 2017/0054865 | A1 | 2/2017 | Min et al. | |
| 2017/0083697 | A1 | 3/2017 | Hayashi et al. | |
| 2017/0255495 | A1 * | 9/2017 | Sakanashi | G06F 9/4843 |

(Continued)

FOREIGN PATENT DOCUMENTS

JP 2017-041222 2/2017

*Primary Examiner* — Douglas Q Tran
(74) *Attorney, Agent, or Firm* — IPUSA, PLLC

(57) ABSTRACT

An information processing system includes: first circuitry, on a device, which transmits an execution request for executing a processing flow to a service providing server, the processing flow defining an execution order of a plurality of processing to be executed by the service providing server; and second circuitry on the service providing server, which, in response to the execution request, executes at least one component for executing a particular processing of the plurality of processing in the processing flow, and in case that an error occurs in execution of the particular processing by the component, refers to error notification configuration information associating an error notification condition with each processing included in the processing flow, the error notification condition being different for each processing, and reports that the error has occurred based on an error notification condition associated with the particular processing.

10 Claims, 25 Drawing Sheets

(56) References Cited

U.S. PATENT DOCUMENTS

| | | | |
|---|---|---|---|
| 2017/0346981 | A1 | 11/2017 | Hayashi |
| 2018/0013913 | A1 | 1/2018 | Hayashi et al. |
| 2018/0060131 | A1* | 3/2018 | Namihira ............ G06F 11/0772 |
| 2018/0343352 | A1 | 11/2018 | Hayashi et al. |
| 2019/0045072 | A1 | 2/2019 | Hayashi et al. |
| 2019/0098153 | A1 | 3/2019 | Hayashi |
| 2019/0289160 | A1 | 9/2019 | Hayashi et al. |

* cited by examiner

4000

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

APPLICATION REGISTRATION SCREEN — G400

| G251 | G252 | G253 | G255 | G254 |
|---|---|---|---|---|
| TYPE SELECTION | BASIC CONFIGURATION | DETAILED CONFIGURATION | SCAN CONFIGURATION | REGISTRATION |

■ PLEASE SET DEFAULT VALUE OF SCAN

G401

AVAILABLE

| | | |
|---|---|---|
| ORIENTATION | ORIENTATION THAT CAN BE READ ▽ | ✓ |
| SINGLE SIDED/ DOUBLE SIDED | DOUBLE-SIDED ▽ | |
| SCAN COLOR MODE | AUTO SELECTION ▽ | |
| SCAN RESOLUTION | 300dpi ▽ | ✓ |
| SCAN SIZE | Auto ▽ | ✓ |

G410

G402 G403 G404 G405

NEXT — G440

FIG. 16

```
{
        "type": "scan",
        "name": "test",
        "displayName": {
                "en": "test",
                "ja" "テスト"
        },
        "description": {

        },
        "loginType": "none",
        "status": "change_published"
        "views": [
                {
                        "name": "test1"
                        "flowName": "test_flow",
                        "viewTemplateName": "onescreen"
                        "defaultParameters": {
                                "process": {

                                },
                                "divideByPageNumbers": {

                                }
                        },
                        "userInputParameters": {
                                "process": [],
                                "divideByPageNumbers": [
                                        {
                                                "name": "divisionPageRange"
                                                "displayName": {
                                                        "en": "divisionPageRange",
                                                        "ja" "divisionPageRange"
                                                },
                                                "description": {

                                                },
                                                "inputType": "text"
                                                "options": [],
                                                "required": true,
                                                "validation": null
                                        },
                                        {
                                                "name": "divisionPageNumbers"
                                                "displayName": {
                                                        "en": "divisionPageNumbers",
                                                        "ja" "divisionPageNumbers"
                                                },
                                                "description": {

                                                },
                                                "inputType": "text"
                                                "options": [],
                                                "required": true,
                                                "validation": null
                                        }
                                ]
                        },
                        "sharedParameters": []
                }
        ],
        "defaultScannerSettings": {
                "originalOrientation": "readable"
                "originalSide": "one_sided",
                "scanColor": "auto_color"
                "scanResolution" "300"
        },
        "defaultPrinterSettings": {
                "copies": 1,
                "printColor": "monochrome"
                "printSide" "one_sided"
        }
}
```

601 (bracket: "type" through "views")

602 (bracket: "defaultScannerSettings" and "defaultPrinterSettings")

FIG. 23

| TARGET APPLICATION | NOTIFICATION CONDITION | ERROR NOTIFICATION CONDITION DETERMINATION | MESSAGE | NOTIFICATION MEANS | NOTIFICATION DESTINATION | TARGET COMPONENT ID | PRIORITY |
|---|---|---|---|---|---|---|---|
| BARCODE SCAN | ALL WHEN ERROR OCCURS | { } | SYSTEM ERROR OCCURRED. CONTACT SYSTEM ADMINISTRATOR. | EMAIL | admin@example.com | All | 1 |
| 2D CODE PRINT | WHEN ERROR OCCURS ON SPECIFIC FILE | { "extension": "zip" } | FILE FORMAT NOT COMPATIBLE | SNS | admin | PDF | 2 |
| 2D CODE PRINT | WHEN ERROR OCCURS ON SPECIFIC PARAMETER | { "key": "language" "value": "japanese" "exclusion": [ "key": filetype", "value" "docx" ] } | docx CANNOT BE SPECIFIED IN JAPANESE | CHAT | admin CHANNEL | Stamp | 1 |
| 2D CODE PRINT | WHEN ERROR OCCURS ON SPECIFIC ROUTE | [ "route": [ "ServiceB" "PDF" ] ] | FILE DOWNLOADED FROM SERVICE B MAY BE DAMAGED | EMAIL | admin@example.com | PDF | 1 |

FIG. 24

```
{
  "jobId": 0001,
  "status": "error",
  "details": [
    {
      "componentId": "ServiceB",  ┐
      "status": "success",        │
      "result": {                 ├DESCRIPTION 1
        "filename": "sample.jpg", │
        "fileSize": 32523         ┘
      }
    },
    {
      "componentId": "PDF",  ┐
      "status": "error",     ├DESCRIPTION 2
      "result": null         ┘
    }
  ]
}
```

FIG. 25

| TARGET APPLICATION | NOTIFICATION CONDITION | ERROR NOTIFICATION CONDITION DETERMINATION | MESSAGE | NOTIFICATION MEANS | NOTIFICATION DESTINATION | TARGET COMPONENT ID | PRIORITY |
|---|---|---|---|---|---|---|---|
| BARCODE SCAN | ALL WHEN ERROR OCCURS | { } | SYSTEM ERROR OCCURRED. CONTACT SYSTEM ADMINISTRATOR. | EMAIL | self | All | 1 |
| 2D CODE PRINT | WHEN ERROR OCCURS ON SPECIFIC FILE | { "occurred": "", "extension": "zip" } | FILE FORMAT NOT COMPATIBLE | SNS | admin | PDF | 2 |
| 2D CODE PRINT | WHEN ERROR OCCURS ON SPECIFIC PARAMETER | { "key": "language" "value": "japanese", "exclusion": [ "key": filetype", "value": "docx" ] } | docx CANNOT BE SPECIFIED IN JAPANESE | CHAT | admin CHANNEL | Stamp | 1 |
| 2D CODE PRINT | WHEN ERROR OCCURS ON SPECIFIC ROUTE | [ "route": [ "ServiceB", "PDF" ] ] | FILE DOWNLOADED FROM SERVICE B MAY BE DAMAGED | EMAIL | admin@example.com | PDF | 1 |

FIG. 26

| TARGET APPLICATION | TARGET ERROR CODE | NOTIFICATION CONDITION | ERROR NOTIFICATION CONDITION DETERMINATION | MESSAGE | NOTIFICATION MEANS | NOTIFICATION DESTINATION | TARGET COMPONENT ID | PRIORITY |
|---|---|---|---|---|---|---|---|---|
| BARCODE SCAN | forbidden | ALL WHEN ERROR OCCURS | { "occurred" "all" } | UNAUTHORIZED USER TRYING TO ACCESS FILE | EMAIL | admin@example.com | All | 1 |
| 2D CODE PRINT | | WHEN ERROR OCCURS ON SPECIFIC FILE | { "occurred" "" ; "extension" "zip" } | FILE FORMAT NOT COMPATIBLE | SNS | admin | PDF | 2 |
| 2D CODE PRINT | | WHEN ERROR OCCURS ON SPECIFIC PARAMETER | { "key": "language" "value" "japanese", "exclusion" [ "key": filetype", "value" "docx" ] } | docx CANNOT BE SPECIFIED IN JAPANESE | CHAT | admin CHANNEL | Stamp | 1 |
| 2D CODE PRINT | | WHEN ERROR OCCURS ON SPECIFIC ROUTE | [ "route": [ "ServiceB" "PDF" ] ] | FILE DOWN-LOADED FROM SERVICE B MAY BE DAMAGED | EMAIL | admin@example.com | PDF | 1 |

INFORMATION PROCESSING SYSTEM, PROCESSING EXECUTION METHOD, AND SERVICE PROVIDING SYSTEM

CROSS-REFERENCE TO RELATED APPLICATIONS

This patent application is based on and claims priority pursuant to 35 U.S.C. § 119(a) to Japanese Patent Application Nos. 2019-108934, filed on Jun. 11, 2019, and 2020-072255, filed on Apr. 14, 2020, in the Japan Patent Office, the entire disclosure of which is hereby incorporated by reference herein.

BACKGROUND

Technical Field

The present invention relates to an information processing system, a processing execution method, and a service providing system.

Description of the Related Art

There has been known an information processing system in which an administrator or the like performs detailed configuration on a processing flow in which a number of processing flows are connected, and registers an application that executes a plurality of processing suitable for the operation of a user. The user can call an application from a device, and execute a series of processing. In many information processing systems, a graphical tool (hereinafter, referred to as a flow design tool) for an administrator to set an application is provided. The administrator can generate an application using a browser, dedicated software, or the like. Further, in such an information processing system, it is also possible for the administrator to set a processing flow.

Various errors may occur when an application is executed. If an error occurs, it is preferable to notify the user of the error. As one method of notifying an error, there is a method of determining whether an error has occurred before executing an application and presenting the determination result to the user. However, even if it is determined that no error occurs before an application is executed, an error may occur when an application is actually executed.

Therefore, there has been known a technique for notifying a user of an error when the error occurs on the executed application. For example, disclosed is an information processing system that performs error processing by calling processing corresponding to an error when the error occurs.

However, the conventional technique has a drawback that an error cannot be notified according to the processing in which the error has occurred. For example, in case where a message is desired to be notified according to the processing in which an error has occurred, conventionally, it has been difficult to deal with a countermeasure for changing the message in accordance with the processing in which the error has occurred.

SUMMARY

Example embodiments include an information processing system including: a device including first circuitry; and a service providing server communicably connected with the device via t network, including second circuitry. The first circuitry transmits an execution request for executing a processing flow to the service providing server, the processing flow defining an execution order of a plurality of processing to be executed by the service providing server. The second circuitry, in response to the execution request for the processing flow, executes at least one component for executing a particular processing of the plurality of processing in the processing flow. In case that an error occurs in execution of the particular processing by the component, the second circuitry refers to error notification configuration information associating an error notification condition with each processing included in the processing flow, the error notification condition being different for each processing, and reports that the error has occurred based on an error notification condition associated with the particular processing.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 16 is a diagram illustrating an example of application configuration information set by an administrator in FIGS. 12 to 15;

FIG. 23 is a diagram illustrating an example of an error notification configuration table that stores information set in an error notification configuration field on the application registration screen;

FIG. 24 is a diagram illustrating an example of a log file recorded when a processing flow is executed;

FIG. 25 is a diagram illustrating an example of an error notification configuration table in which "self" is set as one of notification destinations; and FIG. 26 is a diagram illustrating an example of an error notification configuration table for issuing an error notification based on an error that has occurred.

Figure 1A:
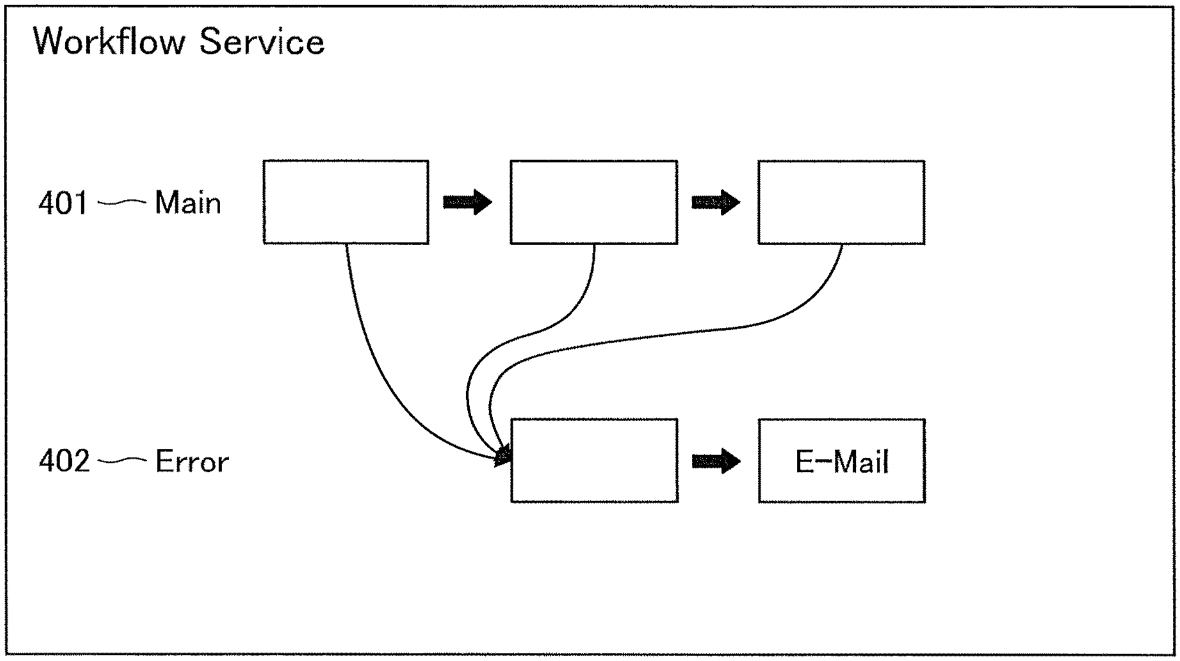
FIGS. 1A and 1B (FIG. 1) are a diagram for explaining an error notification method (comparative example) when an error occurs during execution of an application.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, as an example of an embodiment for carrying out the present invention, an information processing system and a processing execution method performed by the information processing system will be described with reference to the drawings.

Before describing the information processing system according to the present embodiment, a comparative example regarding an error at the time of execution of an application will be described.

Figure 1B:
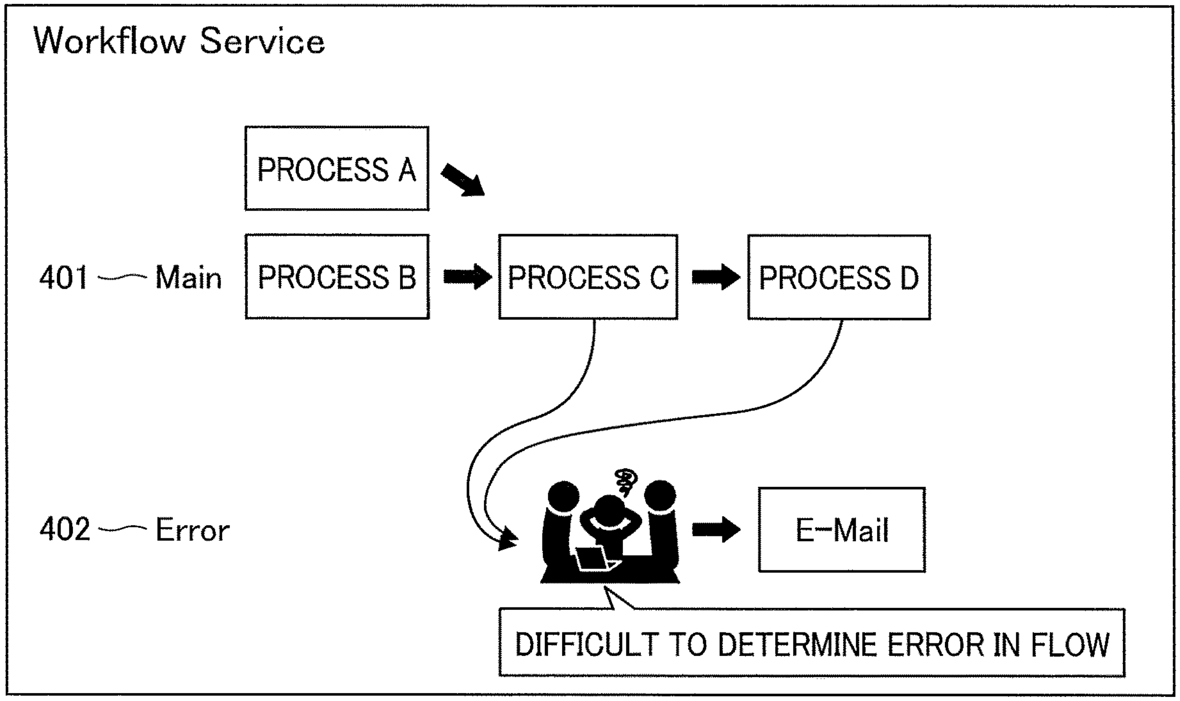

FIGS. 1A and 1B are diagrams for explaining an error notification method (comparative example) when an error occurs during execution of an application. In FIG. 1A, the blocks on the right side of a main 401 represent each processing included in an application, and the blocks on the right side of the error 402 represent each processing executed when an error occurs.

An administrator registers one or more processing to be executed when an error occurs. When an error occurs during the execution of an application, the information processing system executes the processing to be executed when the error occurs. However, as illustrated in FIG. 1A, the same error processing is executed regardless of which processing causes an error. Therefore, it is difficult to notify which processing an error has occurred.

Therefore, as illustrated in FIG. 1B, consideration is given to the processing (timing) in which an error has occurred. However, in order to consider the processing in which an error has occurred, it is necessary to perform a complicated conditional branch on the error processing side. Therefore, the method has a disadvantage that the burden on the flow creator (administrator) is large, and the number of maintenance steps increases.

In the following, operation of notifying an error that has occurred during execution of an application in the information processing system according to the present embodiment will be described.

Figure 2:
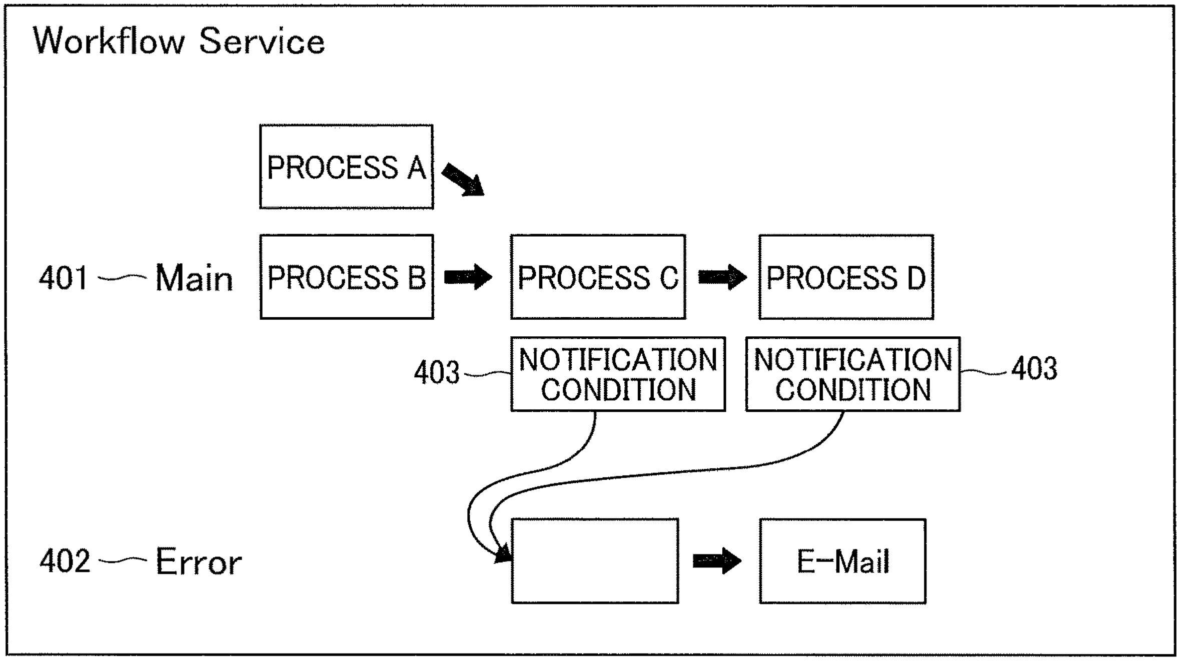
FIG. 2 is a diagram for explaining an overview of a notification method for notifying an error occurred during execution of an application in the present embodiment.

FIG. 2 is a diagram illustrating operation of notifying an error that has occurred during execution of an application. In the present embodiment, an administrator can set notification condition 403 for each processing of an application. In FIG. 2, the notification condition 403 is set in each of processing C and processing D. The notification condition 403 in each processing may be different (may be the same). When an error occurs during execution of an application, the information processing system notifies the error based on the notification condition.

Examples of the notification condition according to the present embodiment include, but not limited to: 1) When an error occurs in specific processing (timing); 2) When an error occurs on a specific route; 3) When an error occurs in a specific file type; and 4) When an error occurs in a specific parameter or combination of parameters.

The administrator can also set how to notify for each processing as error message or notification destination.

As described above, in the information processing system according to the present embodiment, the administrator can set the error notification condition for each processing. Therefore, the administrator can set the error notification condition in detail. That is, it is possible to notify that an error has occurred in a specific route, an error has occurred in a specific file type, and an error has occurred in a specific parameter or combination of parameters. The route will be supplemented. For example, it is assumed that processing A and processing B are processing for downloading files from clouds A and B, respectively, and processing C is processing for checking downloaded files (for example, determining file type and performing virus check). In case of occurring an error in the processing C, downloading from the cloud A, and downloading the cloud B, when the information processing system changes the notification content of the error, the error notification is easy for the user to understand. For example, when an error occurs in the file check for the file downloaded from the cloud A, the information processing system can make a specific notification such as "The file (sample.txt) downloaded from the cloud A has an incorrect extension."

The information processing system according to the present embodiment can set detailed notification condition for each processing. Therefore, the information system can provide detailed error notification according to the error that has occurred.

In this disclosure, processing flow means a series of processing in which a number of processing are sequentially connected. A part of the processing may not be executed. The processing flow may be referred to as a workflow.

In this disclosures, application means a processing flow in which an administrator or the like sets a configuration value or the like for each processing. The processing flow and the application may be the same. Application software executed by a personal computer (PC) or the like is the same as the processing flow, from the point of view that data processing is executed.

In this disclosure, administrator is a person (flow creator) who sets or registers an application (processing flow). The administrator is not limited to a system administrator, but may be an application developer. For example, a dealer or a vendor of a service providing system 10 may be the flow creator.

In this disclosure, user refers a person who executes a registered application. However, the user may be the administrator or the administrator may be the user. Both of the user and the administrator may not be strictly distinguished from each other.

Figure 3:
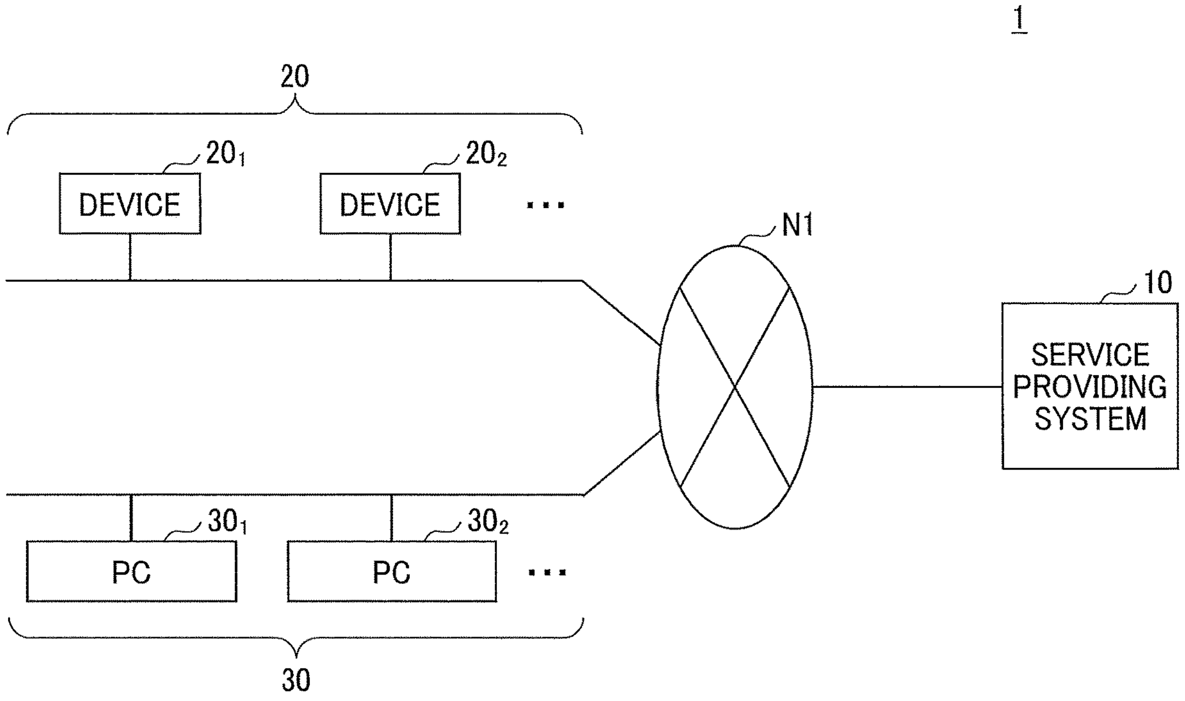
FIG. 3 is a diagram illustrating an example of a system configuration of an information processing system.

The system configuration of an information processing system 1 according to the present embodiment will be described with reference to FIG. 3. FIG. 3 is a diagram illustrating an example of a system configuration of the information processing system 1 according to the present embodiment.

The information processing system 1 in FIG. 3 includes a service providing system 10, a device 20, and a PC 30. The service providing system 10, the device 20, and the PC 30 are communicably connected with one another via a wide area network N1 such as the Internet.

The service providing system 10 is implemented by one or more information processing devices. The service providing system 10 provides various services through performing a series of processing in which one or more processing among a plurality of processing that respectively achieves various functions are combined via the network N1. The service providing system 10 may be referred to as a service providing server.

In this disclosure, function means a function related to an electronic file such as a document file or an image file. The functions include, for example, printing, scanning, facsimile transmission, data format conversion, mail delivery, optical character recognition (OCR) processing, processing, compression and decompression, storing in a repository, or the like.

A specific example of services provided by the service providing system 10 according to the present embodiment will be described later. Hereinafter, a series of processing will be also referred to as a "processing flow".

The device 20 is any desired electronic device used by a user. That is, the device 20 is, for example, an image forming device such as a multifunction peripheral (MFP), a PC, a projector, an electronic whiteboard, a digital camera, or the like. The user may use various services provided by the service providing system 10 by using the device 20.

Hereinafter, a plurality of devices 20 will be described using subscripts such as "device $\mathbf{20}_1$" and "device $\mathbf{20}_2$" to distinguish each device from one another.

The PC 30 is, for example, a desktop PC, a notebook PC, a smartphone, a tablet terminal or the like used by the user. The user can use the various services provided by the service providing system 10 by using the PC 30.

Hereinafter, a plurality of PCs 30 will be described using subscripts such as "PC $\mathbf{30}_1$" and "PC $\mathbf{30}_2$" to distinguish each PC from one another.

The configuration of the information processing system 1 in FIG. 3 is an example, and other configurations may be employed. For example, the information processing system 1 according to the present embodiment may include various devices that perform at least one of input and output of an electronic file, and the devices may use various services provided by the service providing system 10.

Figure 4:
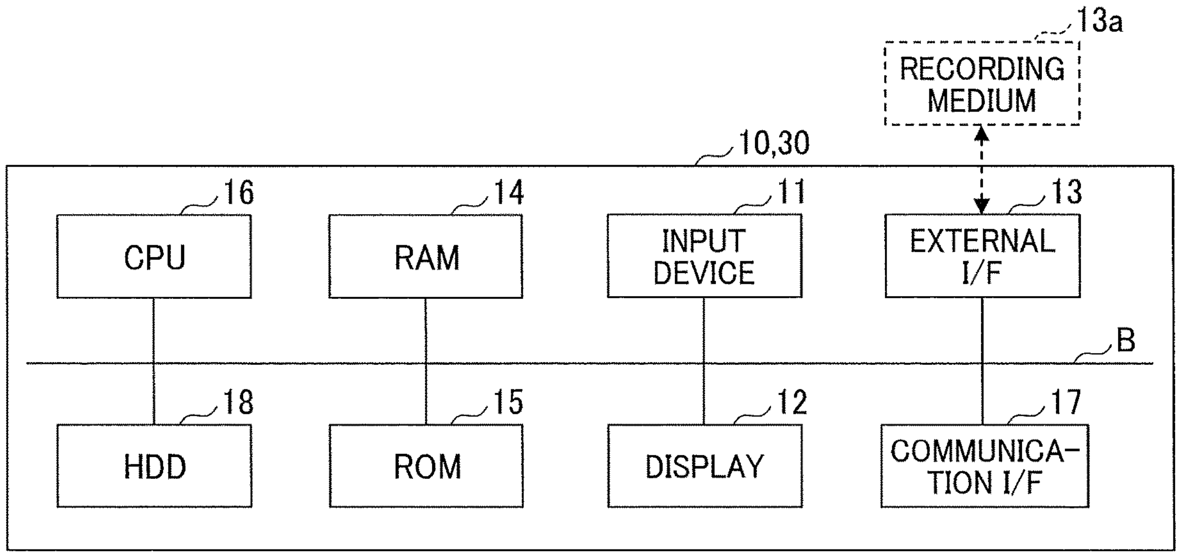
FIG. 4 is a diagram illustrating a hardware configuration of an example of a service providing system and a personal computer (PC)

The hardware configuration of the service providing system 10 and the PC 30 in the information processing system 1 according to the present embodiment will be described with reference to FIG. 4. FIG. 4 is a diagram illustrating an example of hardware configuration of the service providing system 10 and the PC 30 according to the present embodiment. Since the service providing system 10 and the PC 30 have the same hardware configuration, the hardware configuration of the service providing system 10 will be mainly described hereinafter.

The service providing system 10 in FIG. 4 includes an input device 11, a display 12, an external interface (I/F) 13, and a random access memory (RAM) 14. Further, the service providing system 10 includes a read only memory (ROM) 15, a central processing unit (CPU) 16, a communication I/F 17, and a hard disk drive (HDD) 18. Each of the hardware are connected to one another by a bus B.

The input device 11 includes a keyboard, a mouse, a touch panel, or the like, and is used for a user to input each operation signal. The display 12 includes a display or the like, and displays the processing result by the service providing system 10. At least one of the input device 11 and the display 12 may be used while being connected to the service providing system 10 when necessary.

The communication I/F 17 is an interface that connects the service providing system 10 to the network N1. The service providing system 10 can communicate with any other device via the communication I/F 17.

The HDD 18 is a non-volatile storage device that stores a program and data. The program and data in the HDD 18 are an operating system (OS) that is basic software that controls the entire service providing system 10, application software that provides various functions on the OS, or the like.

The service providing system 10 may be a drive device that uses a flash memory as a storage medium (for example, a solid state drive: SSD) instead of the HDD 18. Further, the HDD 18 stores programs and data in a predetermined file system and/or DB.

The external I/F 13 is an interface with an external device. The external device is a recording medium 13*a* or the like. The service providing system 10 may read and write from and into the recording medium 13*a* respectively via the external I/F 13. The recording medium 13*a* is flexible disk, CD, DVD, SD memory card, universal serial bus (USB) memory, or the like.

The ROM 15 is a non-volatile semiconductor memory that can retain a program and data even when the power is turned off. The ROM 15 stores a program and data such as a basic input/output system (BIOS) executed when the service providing system 10 is started, an OS configuration, and a network configuration. The RAM 14 is a volatile semiconductor memory that temporarily retains a program and data.

The CPU 16 is an arithmetic device that reads a program and data from a storage device such as the ROM 15 and the HDD 18 onto the RAM 14, and executes the read program and data, so as to control entire service providing system 10.

The service providing system 10 and the PC 30 according to the present embodiment have the hardware configuration illustrated in FIG. 4, and can implement various types of processing as will be described later.

Figure 5:
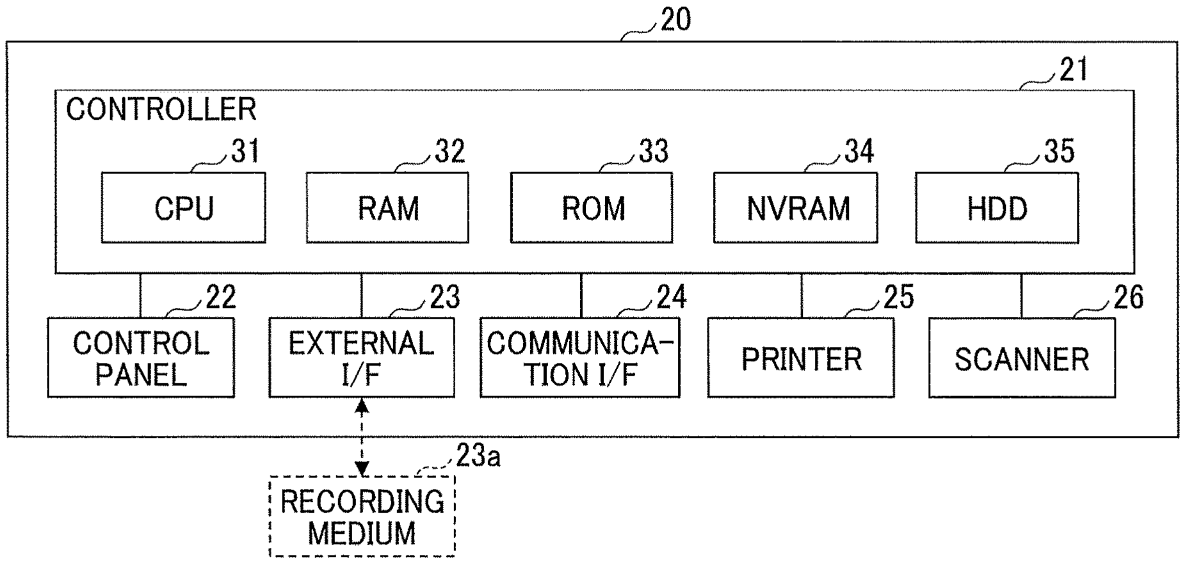
FIG. 5 is a diagram illustrating an example of a hardware configuration of a device.

Referring to FIG. 5, a hardware configuration in a case where the device 20 in the information processing system 1 is an image forming device will be described as an example.

FIG. 5 is a diagram illustrating an example of a hardware configuration of the device 20 according to the present embodiment.

The device 20 in FIG. 5 includes a controller 21, a control panel 22, an external I/F 23, a communication I/F 24, a printer 25, and a scanner 26. The controller 21 includes a CPU 31, a RAM 32, a ROM 33, an NVRAM 34, and an HDD 35.

The ROM 33 is a non-volatile semiconductor memory that stores various programs and data. The RAM 32 is a volatile semiconductor memory that temporarily retains a program and data. The NVRAM 34 stores, for example, configuration information or the like. The HDD 35 is a non-volatile storage device that stores various programs and data.

The CPU 31 is an arithmetic device that reads a program, data, configuration information, or the like from the ROM 33, the NVRAM 34, the HDD 35, or the like onto the RAM 32, and processes the read information, so as to control entire device 20.

The control panel 22 includes an input device that receives an input from a user, and a display that displays. The external I/F 23 is an interface with an external device. The external device is a recording medium 23*a* or the like. The device 20 may read and/or write from/to the recording medium 23*a* via the external I/F 23. The recording medium 23*a* is, for example, IC card, flexible disk, CD, DVD, SD memory card, USB memory, or the like.

The communication I/F 24 is an interface for connecting the device 20 to the network. The device 20 can communicate via the communication I/F 24. The printer 25 is a printing device that prints print data. The scanner 26 is a reading device that reads a document and generates an electronic file (image file).

The device 20 according to the present embodiment includes the hardware configuration illustrated in FIG. 5 and can implement various types of processing as will be described later.

Figure 6:
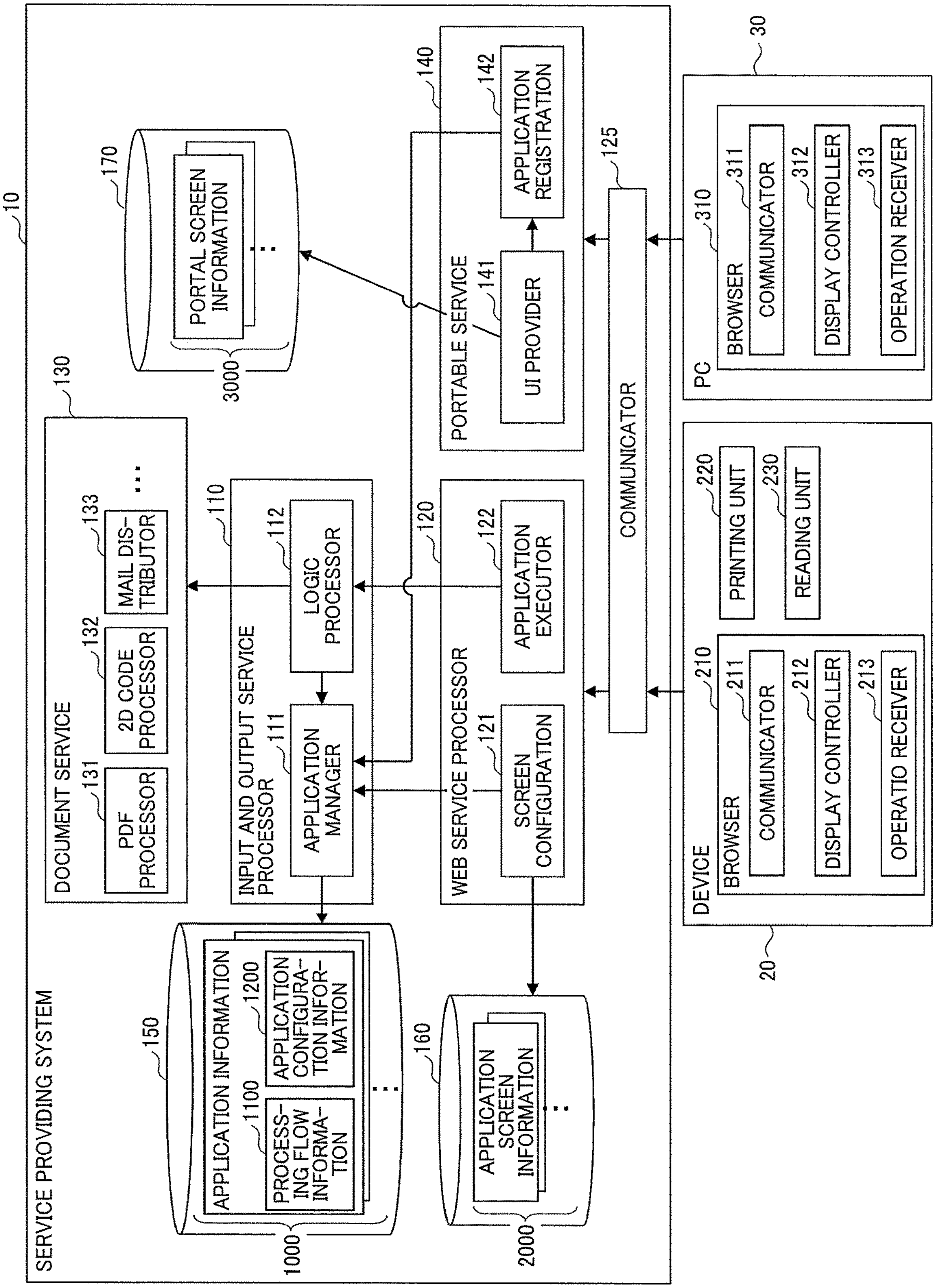
FIG. 6 is a diagram illustrating an example of a functional configuration of the information processing system.

The functional configuration of the information processing system 1 according to the present embodiment will be described with reference to FIG. 6. FIG. 6 is a diagram illustrating an example of a functional configuration of an information processing system according to the present embodiment.

The PC 30 in FIG. 6 includes a browser 310 executed by the CPU 16 or the like, for example. The administrator who operates the PC 30 can use the browser 310 to register an application that performs printing using the two-dimensional code in the service providing system 10. Hereinafter, the application is referred to as a two-dimensional code printing application, and the service provided by executing the two-dimensional code printing application is referred to as a two-dimensional code printing service.

The browser 310 includes a communicator 311, a display controller 312, and an operation receiver 313. The communicator 311 transmits and receives various types of information to and from the service providing system 10. The display controller 312 analyzes screen information received from the service providing system 10, and displays the analysis information on the display 12. The operation receiver 313 receives various kind of operations on the PC 30. The operation receiver 313 may include a function included in a general browser. It is assumed that the functions of a browser 210 described below are the same as those of the browser 310.

The device 20 in FIG. 6 includes a browser 210 executed by, for example, the CPU 31 or the like. The browser 210 further includes a communicator 211 (an example of a first communicator), a display controller 212, and an operation receiver 213. The user of the device 20 can use various services such as "two-dimensional code printing" using the browser 210. That is, the device 20 may have a browser 210. Therefore, the device 20 does not need to have, for example, a dedicated application program or the like for using various services provided by the service providing system 10. When the device 20 is an image fotining device, the device 20 includes a printing unit 220 and a reading unit 230. The printing unit 220 prints an electronic file on a paper sheet. The reading unit 230 optically reads a document to generate an electronic file.

The service providing system 10 in FIG. 6 includes an input and output service processor 110, a Web service processor 120, a document service 130, and a portal service 140. Each of the functional units is implemented by processing of the CPU 16 that executes one or more programs in the service providing system 10.

The service providing system 10 includes an application information storage 150, an application screen information storage 160, and a portal screen information storage 170. Each of the storages can be implemented by using the HDD 18. At least one of the storages may be implemented using a storage device or the like connected to the service providing system 10 via the network.

The input and output service processor 110 performs the processing related to the service provided by the service providing system 10. The input and output service processor 110 includes an application manager 111 and a logic processor 112.

The application manager 111 manages application information 1000 stored in the application information storage 150. The application information 1000 is an application for using the service implemented by a series of processing. In other words, the various services provided by the service providing system 10 are provided by the application information 1000.

The application manager 111 returns processing flow information 1100 in the application information 1000 in response to the request from the logic processor 112. The processing flow information 1100 is information defining a series of processing that implements the service provided by the application information 1000.

The application manager 111 stores the application information 1000 in the application information storage 150 in response to the request from the portal service 140. As a result, the application information 1000 (application) that provides the service is registered in the service providing system 10.

The logic processor 112 acquires the processing flow information 1100 in the application information 1000 from the application manager 111 in response to the request from the Web service processor 120. Then, the logic processor 112 executes a series of processing (processing flow) that implements the service provided by the application information 1000, based on the processing flow information 1100 acquired from the application manager 111. As a result, the service providing system according to the present embodiment can provide various services such as the "two-dimensional code printing service". Details of the logic processor 112 will be described later.

The Web service processor 120 performs processing for the user to use the various services using the browser 210 on the device 20. That is, the Web service processor 120 functions as an application server that provides the Web application (application information 1000) to the browser 210. The Web service processor 120 includes a screen configurator 121 and an application executor 122.

The screen configurator 121 returns application screen information 2000 in the application screen information storage 160 and application configuration information 1200 included in the application information 1000 in the application information storage 150, in response to the request from the browser 210.

The application screen information 2000 is information defining a template of a screen for using the service provided by the application information 1000 (application screen). The application screen information 2000 is information defining a template of the application screen by, for example, HTML (HyperText Markup Language), XHTML (Extensible HyperText Markup Language), CSS (Cascading Style Sheets), Java Script (registered trademark), or the like.

The application configuration information 1200 is information defining various type of configurations of the application (application infoitnation 1000). For example, the application configuration information 1200 defines parameter information input by a user, parameter information set by default, or the like among the parameter information used for executing a series of processing. For example, the application configuration information 1200 defines an input item for the user to input the parameter information on the application screen, a display information (for example, application name) on the application screen, or the like. The application configuration information 1200 is, for example, information that defines various kind of configurations of the application by JSON (JavaScript Object Notation) or the like.

Thereby, the device 20 displays the application screen for using the service provided by the service providing system 10 by the browser 210.

The application executor 122 transmits an execution request for the application (application information 1000) to the input and output service processor 110 in response to the request from the browser 210.

The document service 130 executes a predetermined process in a series of processing (processing flow) based on the processing flow information 1100. The document service 130 includes a pdf processor 131, a two-dimensional code processor 132, and a mail distributor 133.

The pdf processor 131 converts an electronic file into a pdf file. The two-dimensional code processor 132 embeds a two-dimensional code in an electronic file. The mail distributor 133 generates mail with an electronic file attached thereto and distributes the mail to a designated mail address.

The document service 130 may further include various functional units such as an OCR processor for OCR processing, a compression and decompression processor for compressing or decompressing an electronic file, a data format converter for converting a data format of an electronic file, or the like.

The portal service 140 performs processing for a user to register an application or the like using the browser 310 of the PC 30. The portal service 140 includes a UI provider 141 and an application registration 142.

The UI provider 141 returns portal screen information 3000 in the portal screen information storage 170 in response to the request from the browser 310. The portal is a website capable of performing application registration or the like using the browser 310.

The portal screen information 3000 is information defining various kind of screens such as a top screen for the portal (portal top screen) and an application registration screen. The portal screen information 3000 is information that defines various screens by the browser 210 such as HTML, XML, CSS, and JavaScript, for example.

Accordingly, the PC 30 displays the portal top screen and the application registration screen by the browser 310. Therefore, the user of the PC 30 can register an application (application information 1000) on the application registration screen.

The application registration 142 requests the application manager 111 to register an application (application information 1000) in response to the request from the UI provider 141. That is, when an application is registered on the application registration screen, the application registration 142 requests the application manager 111 to register the application.

The application information storage 150 stores the application information 1000. The application information 1000 is stored in the application information storage 150 in association with an application ID for identifying the application information 1000. The application ID is, for example, a uniform resource locator (URL) for the application information 1000, identification information included in the URL for the application information 1000, or the like.

The application information 1000 includes the processing flow information 1100 and the application configuration information 1200. For example, the application information 1000 that provides the two-dimensional code printing service includes the processing flow information 1100 defining a series of processing that implements the service, and the application configuration information 1200 defining various configurations of the application information 1000.

The application information 1000 may include two or more processing flow information 1100 and two or more application configuration information 1200.

As described above, the processing flow information 1100 is information that defines a series of processing (processing flow) that implements the service provided by the application information 1000. Details of the processing flow information 1100 will be described later.

The application configuration information 1200 is information defining various types of configurations for the application (application information 1000) as described above. Details of the application configuration information 1200 will be described later.

The application screen information storage 160 stores the application screen information 2000. The application screen information 2000 is stored in the application screen information storage 160 in association with the application ID.

The portal screen information storage 170 stores the portal screen information 3000. The portal screen information 3000 is stored in the portal screen information storage 170 in association with a URL for the portal top screen, the application registration screen, or the like.

The input and output service processor 110, the Web service processor 120, the document service 130, the portal service 140, or the like may be implemented by different information processing devices.

Figure 7:
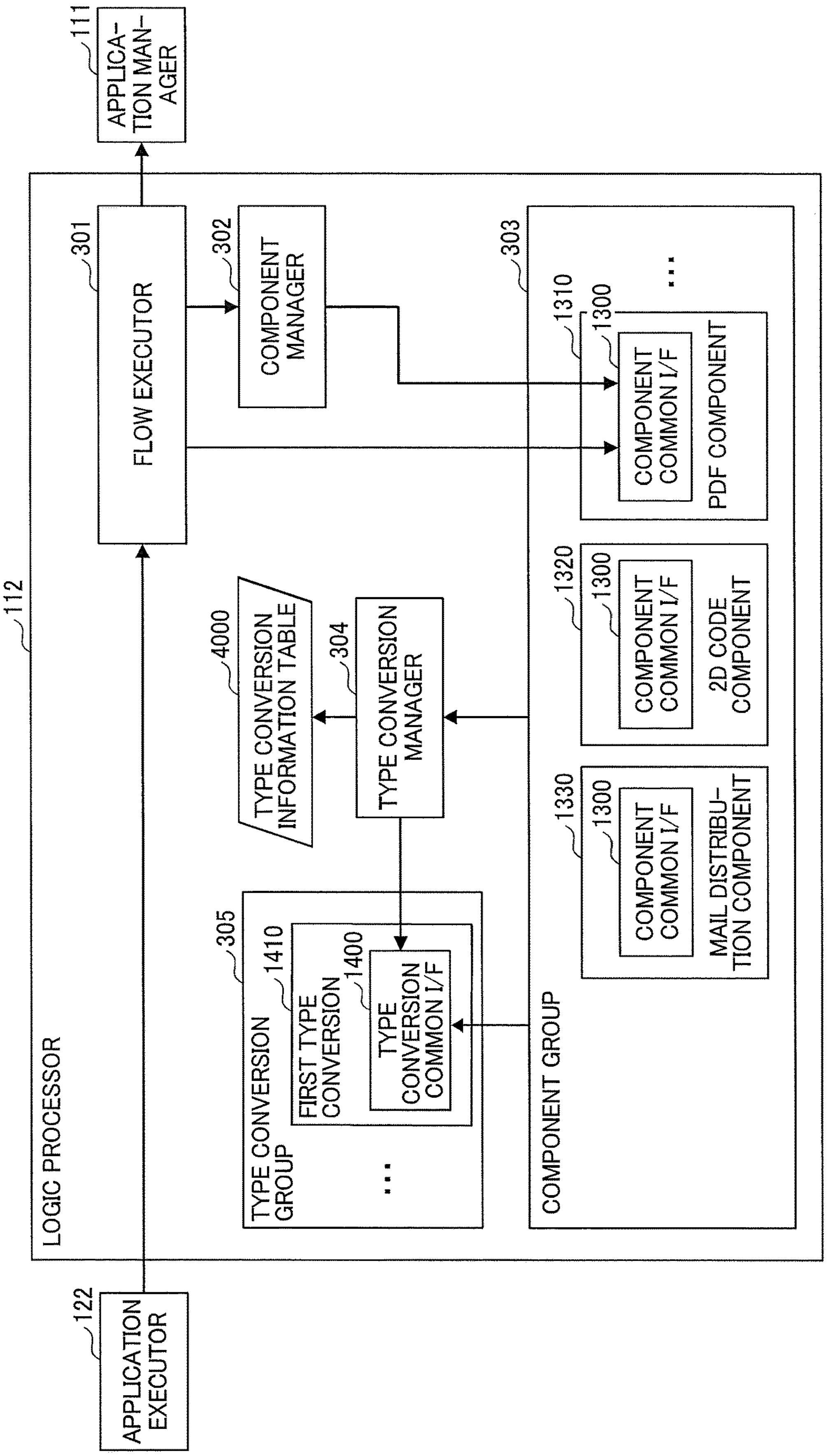
FIG. 7 is a diagram illustrating an example of a functional configuration of a logic processor.

The detailed functional configuration of the logic processor 112 will be described with reference to FIG. 7. FIG. 7 is a diagram illustrating an example of a functional configuration of the logic processor 112 according to the present embodiment.

The logic processor 112 in FIG. 7 includes a flow executor 301, a component manager 302, a component group 303, a type conversion manager 304, and a type conversion group 305. The logic processor 112 includes a type conversion information table 4000.

When the flow executor 301 receives an application execution request from the application executor 122, the flow executor 301 acquires the processing flow information 1100 corresponding to the execution request from the application manager 111. Then, the flow executor 301 executes a series of processing (processing flow) based on the processing flow information 1100 acquired from the application manager 111.

The series of processing based on the processing flow information 1100 is executed by combining components for executing each processing included in the series of processing. The component is implemented by a program or module for executing a process for realizing a predetermined function, and is defined by, for example, a class or a function.

The component manager 302 manages the components. In response to the request from the flow executor 301, the component manager 302 generates a component, and returns the generated component to the flow executor 301. Generating a component is developing a component defined by a class, a function, or the like, for example, on a memory (for example, RAM 14).

The component group 303 is a set of components. The component group 303 includes a pdf component 1310, a two-dimensional code component 1320, and a mail distribution component 1330.

The pdf component 1310 is a component for converting an electronic file (image file) into a pdf file. The two-dimensional code component 1320 embeds a two-dimensional code in an electronic file. The mail distribution component 1330 is a component for delivering a mail to a designated mail address. The pdf component 1310 requests the pdf processor 131 to execute the processing, the two-dimensional code component 1320 requests the two-dimensional code processor 132 to execute the processing, and the mail distribution component 1330 requests the mail distributor 133 to execute the processing. However, each component itself may execute the corresponding processing.

As described above, each component executes processing that achieves a predetermined function. In addition to the above components, the component group 303 includes various components such as an encryption and decryption component for encrypting or decrypting an electronic file, a compression component for compressing an electronic file, or the like.

Each component in the component group 303 includes a component common I/F 1300. The component common I/F 1300 is an application programming interface (API) commonly defined for each component, and includes an API for generating a component and an API for executing a process of the component.

As described above, since each component has the component common I/F 1300, it is possible to localize the influence associated with the addition of component or the like. That is, for example, it is possible to add a component without affecting the flow executor 301, the component manager 302, or the like. As a result, the service providing system 10 according to the present embodiment can reduce the number of development steps involved in adding a predetermined function or the like (that is, adding a component for executing a process for realizing the function, or the like).

The type conversion manager 304 manages the type conversion of a data type. The data type that each component can handle is predeteiuiined. Therefore, the type conversion manager 304 generates the type conversion included in the type conversion group 305 by referring to the type conversion information table 4000 illustrated in FIG. 8, for example, in response to the request from a component.

The type conversion manager 304 requests the generated type conversion to execute type conversion processing. The type conversion is realized by a program, a module, or the like for executing the type conversion processing of the data type, and is defined by, for example, a class, a function, or the like. Generating a type conversion means developing a type conversion defined by a class, a function, or the like, for example, on a memory (for example, on the RAM 14).

The data type is, for example, a data type "InputStream" indicating stream data, "LocalFilePath" indicating a path (address) for an electronic file stored in a storage device, "File" indicating the substance of the electronic file, or the like.

Figures 8, 9:
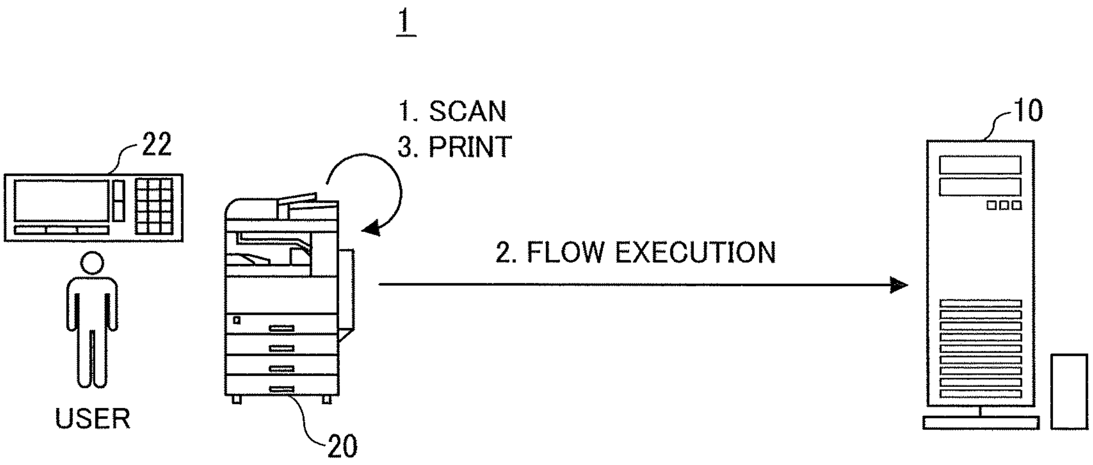
FIG. 8 is a diagram illustrating an example of a type conversion information table.
FIG. 9 is an example of a diagram illustrating a flow in which a scan & print application inputs an electronic file read by a scanner, executes a processing flow, and prints an execution result of the processing flow.

The type conversion information table 4000 will be described with reference to FIG. 8. FIG. 8 is a diagram illustrating an example of the type conversion information table 4000.

The type conversion information table 4000 in FIG. 8 includes, as data items, a data type before conversion, a data type after conversion, and a type conversion to be generated. That is, the type conversion information stored in the type conversion information table 4000 is information in which the data type before the conversion and the type conversion for converting into the data type after the conversion are associated with each other, for each data type before conversion and after conversion.

The type conversion group 305 is a set of type conversion. The type conversion group 305 includes a first type conversion 1410 for converting the data type "InputStream" into the "LocalFilePath". The type conversion group 305 further includes, for example, a second type conversion for converting the data type "LocalFilePath" into the "File".

Each type conversion in the type conversion group 305 includes a type conversion common I/F 1400. The type conversion common I/F 1400 is an API commonly defined for each type conversion, and includes an API for generating a type conversion and an API for executing type conversion processing of the type conversion.

As described above, since each type conversion has the type conversion common I/F 1400, it is possible to localize the influence involved in adding the type conversion. That is, for example, it is possible to add the type conversion without affecting the type conversion manager 304 or the like. As a result, the service providing system 10 according to the present embodiment can reduce the number of development steps involved in adding the type conversion or the like.

A service provided by the service providing system 10 according to the present embodiment will be described. In the following description, it is assumed that the device 20 is an image forming device.

In the present embodiment, a case in which an application type "scan and print" is used will be described. FIG. 9 illustrates a processing flow of an application created based on the scan & print. The application executes the following processing:

1. Scan
2. Flow execution (PDF creation, two-dimensional code embedding)
3. Print For example, when a user would like to add a two-dimensional code to a PDF file, by utilizing an application created by the user based on the scan & print, it is possible to realize a series of operations of printing an electronic document, which is obtained by scanning and in which a two-dimensional code is embedded.

In the following, an example of setting an application called a two-dimensional code printing application based on the scan & print will be described. The configuration screen will be described with reference to FIG. 11 and subsequent figures. As for the configuration screen, it is assumed that the PC 30 displays the screen information downloaded from the portal service 140 on the browser 310. Also, the device 20 can register the application.

Figure 10:
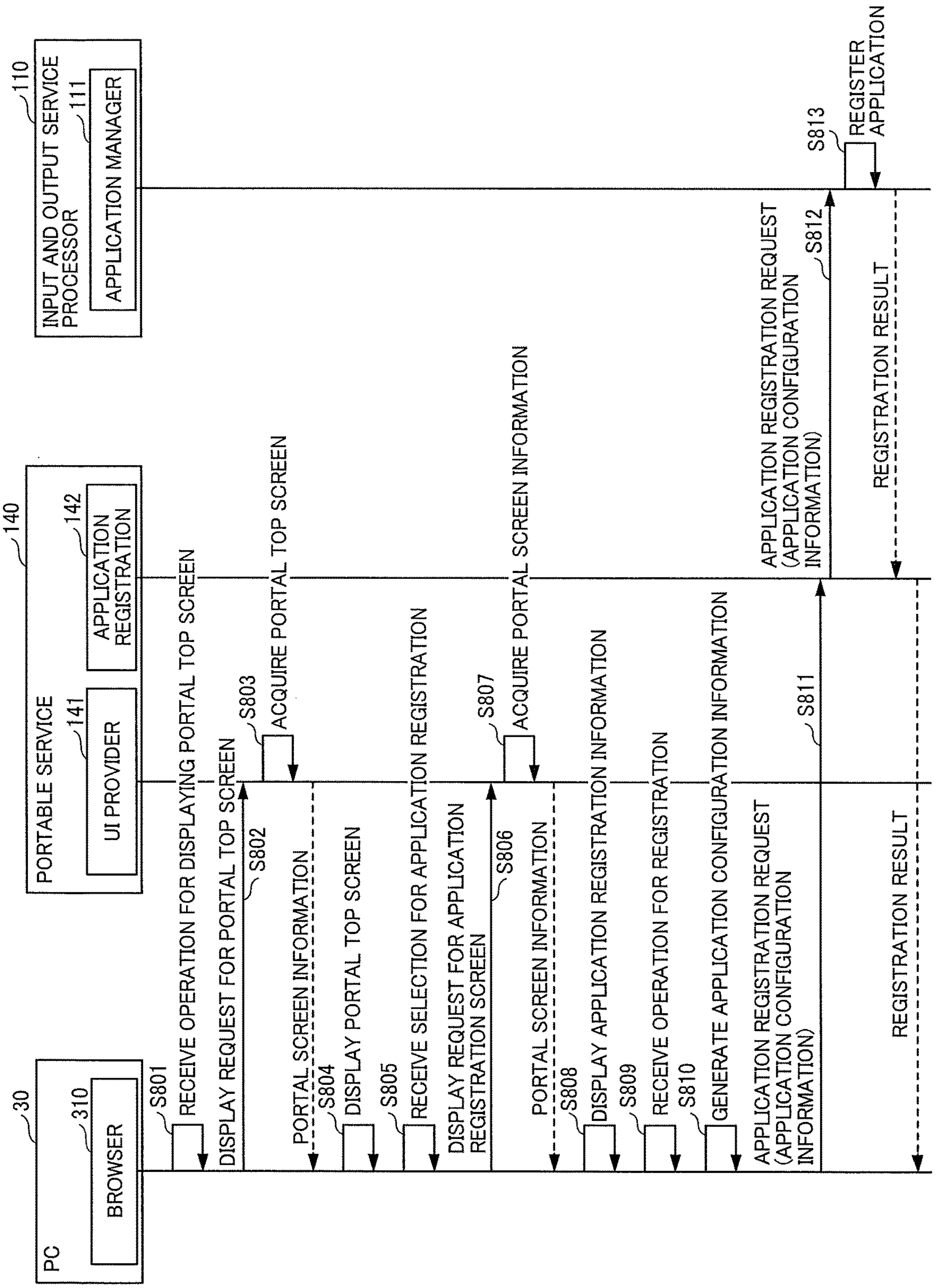
FIG. 10 is a sequence diagram illustrating an example of application registration processing.

FIG. 10 is a sequence diagram illustrating an example of application registration processing.

The browser 310 (operation receiver 313) on the PC 30 receives an operation for displaying the portal top screen (display operation of the portal top screen) (step S801). The user of the PC 30 can input the URL of the portal top screen in the address bar of the browser 310, for example, to perform a display operation for the portal top screen.

When the browser 310 (311) on the PC 30 receives the display operation for the portal top screen, the browser 310 (311) sends a display request for the portal top screen to the UI provider 141 of the portal service 140 (step S802).

When the communicator 125 (example of second communicator) in the service providing system 10 receives the display request for the portal top screen, and the UI provider 141 in the portal service 140 receives the acquisition request for the portal top screen, the UI provider 141 acquires the portal screen information for the portal top screen from the portal screen information storage 170 (step S803). Then, the UI provider 141 returns the portal screen information acquired from the portal screen information storage 170 to the browser 310 via the communicator 125.

Figure 11:
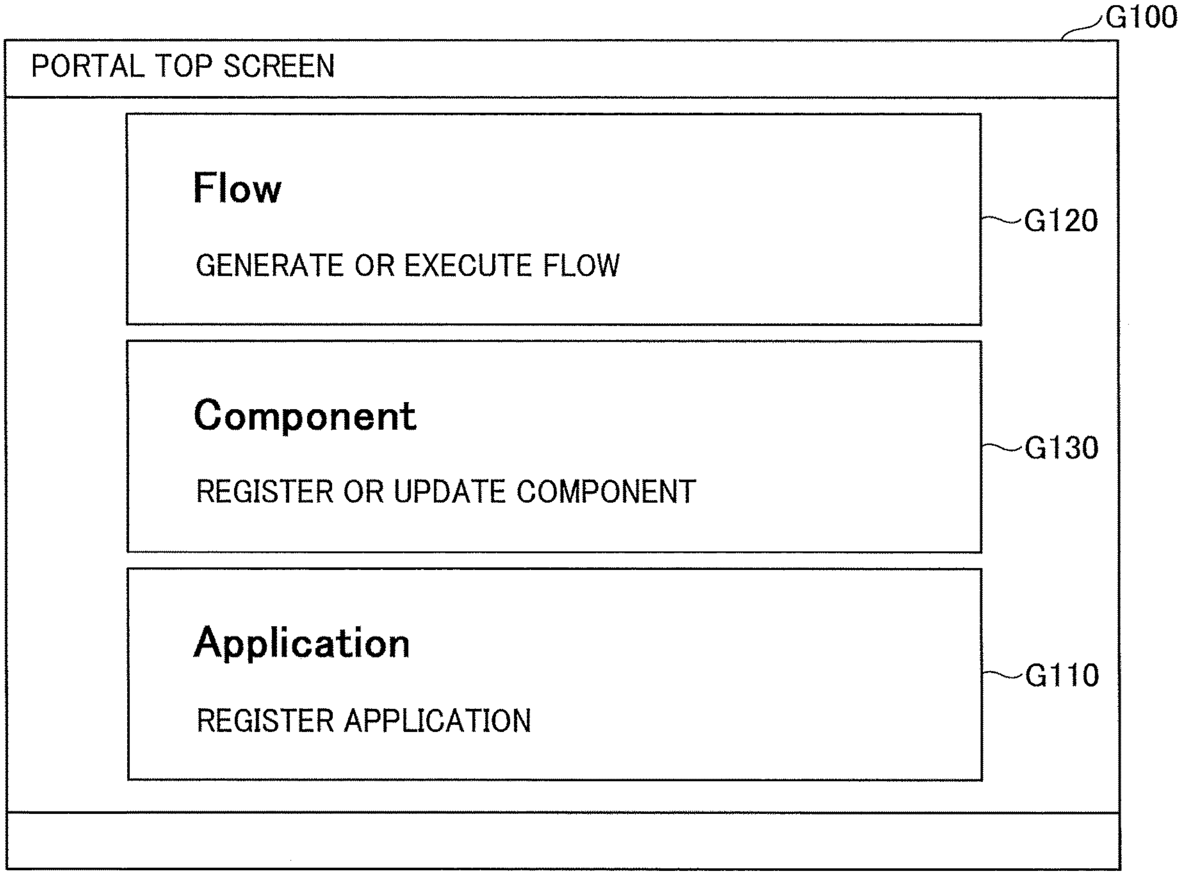
FIG. 11 is a diagram illustrating an example of a portal top screen.

When the browser 310 (display controller 312) on the PC 30 receives the portal screen information for the portal top screen, the browser 310 displays, for example, the portal top screen G100 illustrated in FIG. 11 based on the portal screen information (step S804).

The portal top screen G100 illustrated in FIG. 11 is the portal top screen and includes an "Application" button G110 for registering an application. Hereinafter, it is assumed that a user has performed an operation of selecting the "Application" button G110 (application registration selection operation) on the portal top screen G100 illustrated in FIG. 11.

The portal top screen G100 illustrated in FIG. 11 also includes a "Flow" button G120 for generating the processing flow information 1100 or the like, a "Component" button G130 for registering a component, or the like. As described above, it is possible to generate and execute a processing flow, register and update a component, in addition to registering an application, on the portal top screen G100.

The browser 310 (operation receiver 313) on the PC 30 receives a selection operation for the application registration performed by the user (step S805).

When the browser 310 (communicator 311) on the PC 30 receives the selection operation for the application registration, the browser 310 transmits a display request for the application registration screen to the UI provider 141 of the portal service 40 (step S806).

When the communicator 125 in the service providing system 10 receives the display request for the portal top screen, and the UI provider 141 of the portal service 140 receives the display request for the application registration screen, the UI provider 141 acquires the portal screen information for the application registration screen from the portal screen information storage 170 (step S807). Then, the UI provider 141 returns the portal screen information acquired from the portal screen information storage 170 to the browser 310 via the communicator 311.

Figure 12:
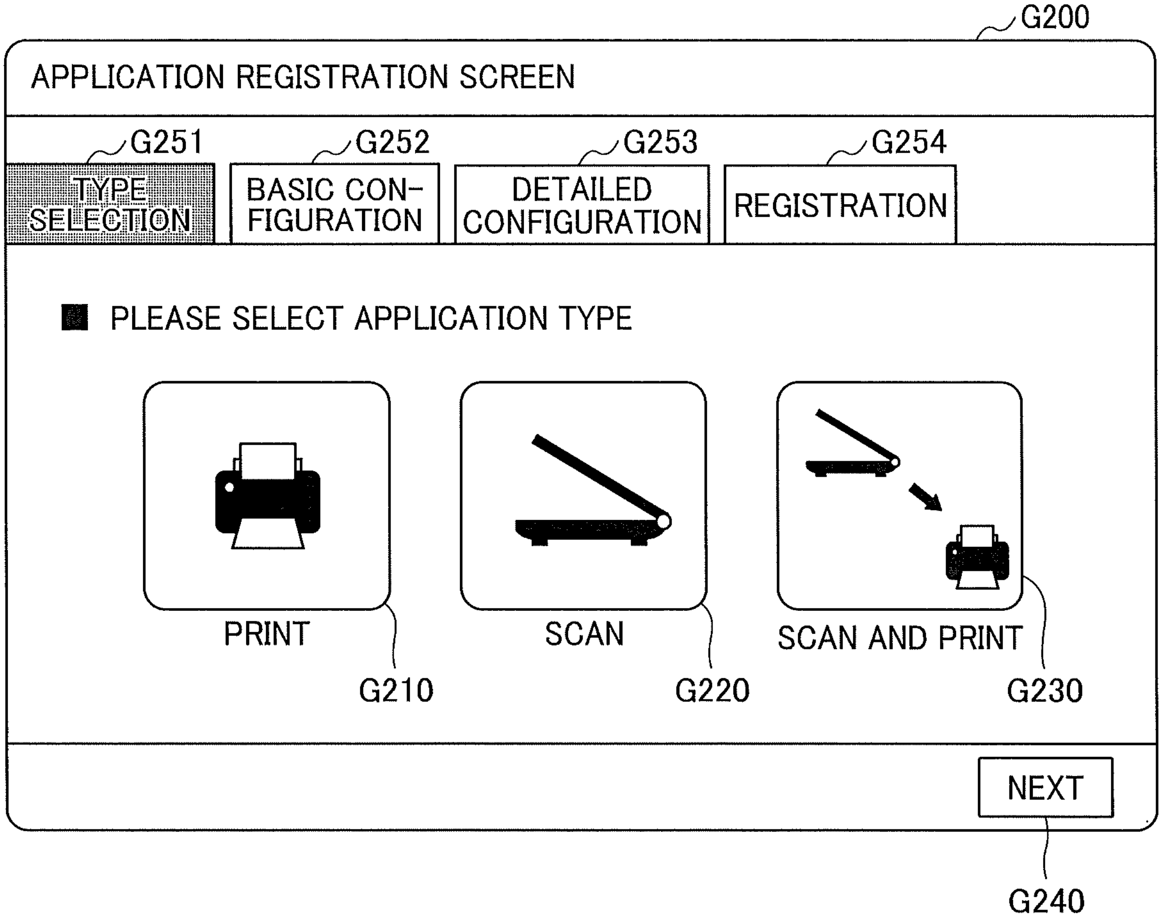
FIG. 12 illustrates an example of an application registration screen G200.

When the browser 310 (communicator 311) on the PC 30 receives the portal screen information for the application registration screen, the display controller 312 displays the application registration screen G200 illustrated in FIG. 12, for example, based on the portal screen information (step S808).

Hereinafter, a case where the administrator perfoi ins an application registration operation will be described with reference to FIGS. 12 to 15.

The application registration screen G200 illustrated in FIG. 12 is a screen for the administrator to select the type of application to be registered. The application registration screen G200 includes a type selection tab G251, a basic configuration tab G252, a detailed configuration tab G253, and a registration tab G254. In FIG. 12, the type selection tab G251 is selected.

The application registration screen G200 illustrated in FIG. 12 includes a "print type" button G210 for registering a print type application, a "scan type" button G220 for registering a scan type application, and a "scan & print type" button G230 for registering a scan & print type application. The application registration screen G200 illustrated in FIG. 12 may include a "FAX type" button to register a FAX type application, a "mail reception type" button for registering a mail reception type application, or the like.

The application registration screen G200 illustrated in FIG. 12 includes a "next" button G240 or the like for transitioning to the next screen.

The print type is an application of a type in which an electronic file indicating an execution result obtained by a series of processing is printed by the image forming device or the like. The scan type is an application of a type that executes a series of processing in which an electronic file generated by scanning in the image forming device or the like is input. The scan & print type is an application of a type in which an electronic file generated by scanning in the image forming device or the like is input and the electronic file is printed by the image forming device or the like.

The FAX type is an application of a type in which an electronic file indicating an execution result by a series of processing is transmitted by facsimile with the image forming device or the like. The mail reception type is an application of a type that executes a series of processing using an electronic file attached to a mail received by the image forming device or the like as an input.

Hereinafter, it is assumed that the administrator selects the "scan & print type" button G230 and then presses the "next" button G240 on the application registration screen G200 illustrated in FIG. 12. Then, the operation receiver 313 of the browser 310 accepts the operation, and displays the application registration screen G300 illustrated in FIG. 13, for example.

Figure 13:
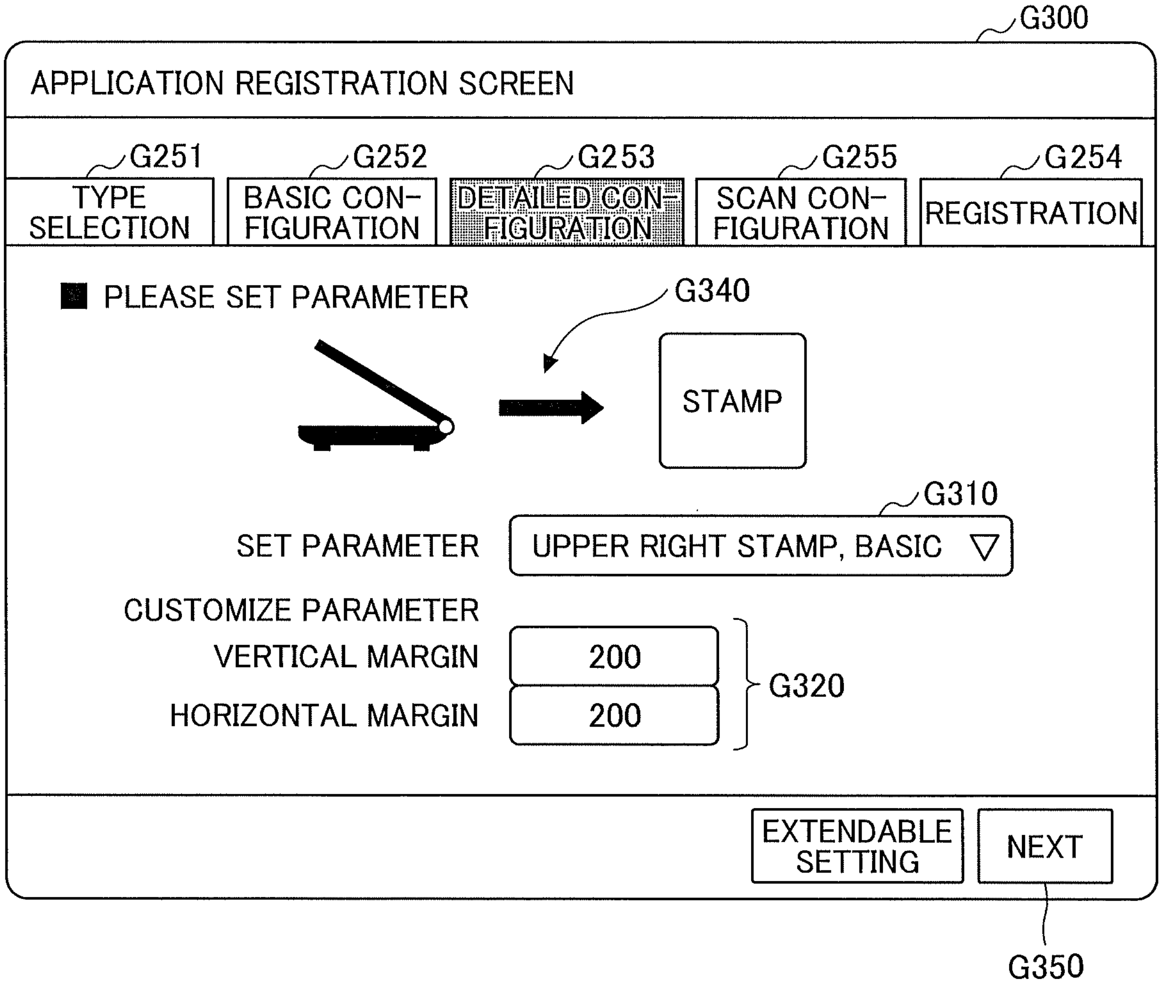
FIG. 13 illustrates an example of an application registration screen G300.

The application registration screen G300 illustrated in FIG. 13 is a screen for the administrator to set detailed configuration of an application. The detailed configuration tab G253 is selected on the application registration screen G300. The administrator can set the basic configuration for the application such as the application name and the corresponding language on the basic configuration tab G252.

The detailed configuration tab G253 receives parameters that the administrator inputs in the application. The application registration screen G300 illustrated in FIG. 13 includes a parameter selection field G310, and a parameter customization field G320. The parameter customization field G320 is configured to set the arrangement position of the two-dimensional code (stamp) and the margin, for example.

The application registration screen G300 includes a processing flow field 340 having one or more icons arranged in the processing order. One icon corresponds to one processing (may correspond to a plurality of processing). FIG. 13 illustrates a screen for scanning and embedding (stamping) the two-dimensional code.

Figure 14:
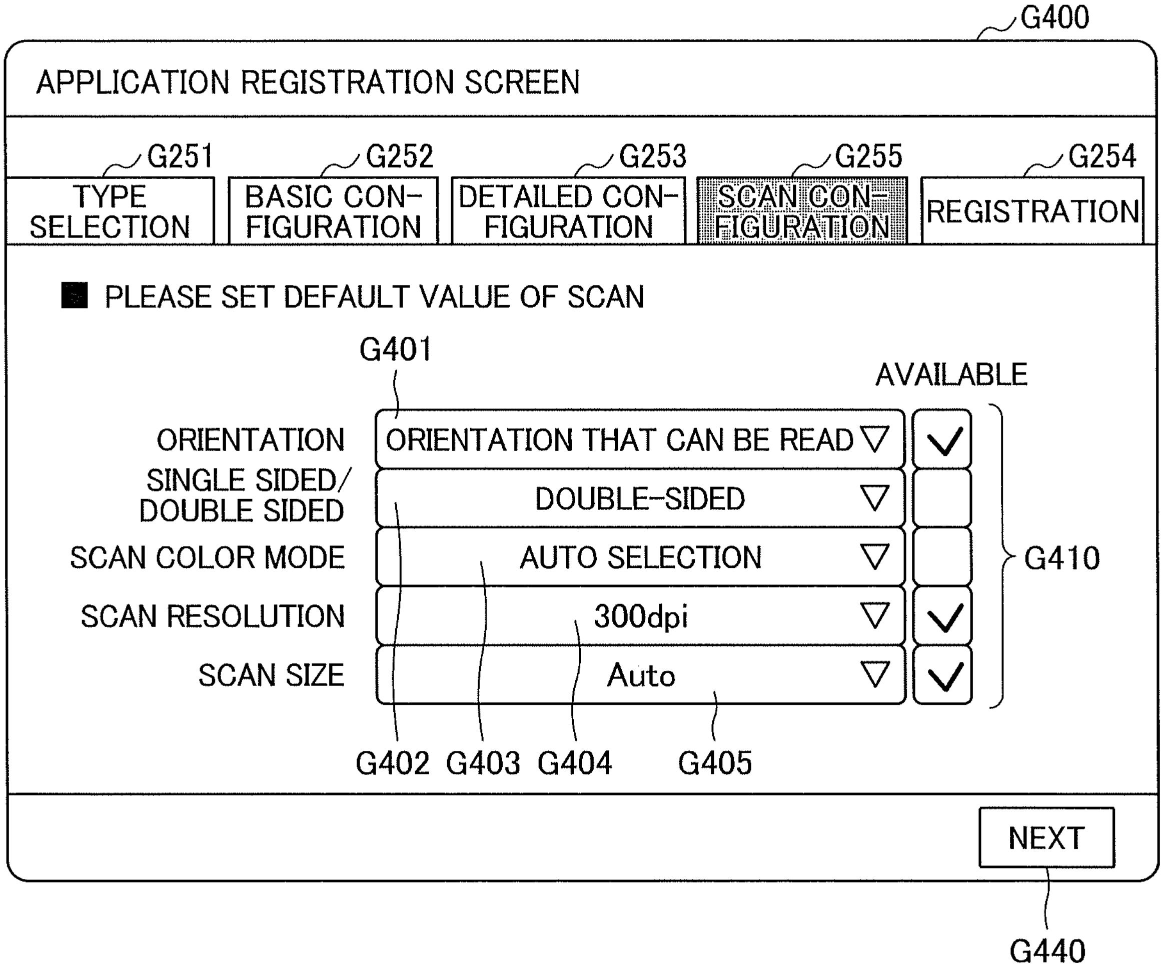
FIG. 14 illustrates an example of an application registration screen G400.

Hereinafter, it is assumed that the administrator has performed an operation of selecting a parameter and pressing the "next" button G350 on the application registration screen G300 illustrated in FIG. 13. Then, the operation receiver 313 of the browser 310 accepts the operation and displays the application registration screen G400 illustrated in FIG. 14, for example. In FIG. 14, a scan configuration tab G255 is selected.

The application registration screen G400 illustrated in FIG. 14 is a screen for the administrator to set a scan condition with a default value. The administrator can set the default value for the scan with respect to the scan type or scan & print type application on the application registration screen G400.

The application registration screen G400 illustrated in FIG. 14 includes select boxes for a paper orientation configuration field G401, a one-side and both-sides configuration field G402, a reading color mode configuration field G403, a reading resolution configuration field G404, and a reading size configuration field G405. A check box G410 is associated with each configuration field.

When the administrator selects arbitrary value from the select box for each configuration field, the value of each configuration field becomes the default value for the application to be generated when scanning. In the check box G410 arranged beside each of the select boxes, "check" means "changeable" from the default value, and "no check" means "unchangeable". The administrator can limit the scan configuration that can be set by the user when executing the application. Therefore, it is possible to set a fixed value for each application, such as limiting the resolution.

The operation receiver 313 of the browser 310 thus accepts the registration operation for scanning (step S809).

Hereinafter, it is assumed that the administrator has performed an operation of pressing the "next" button G440. Then, the operation receiver 313 of the browser 310 accepts the operation, and displays the application registration screen G500 illustrated in FIG. 15, for example.

Figure 15:
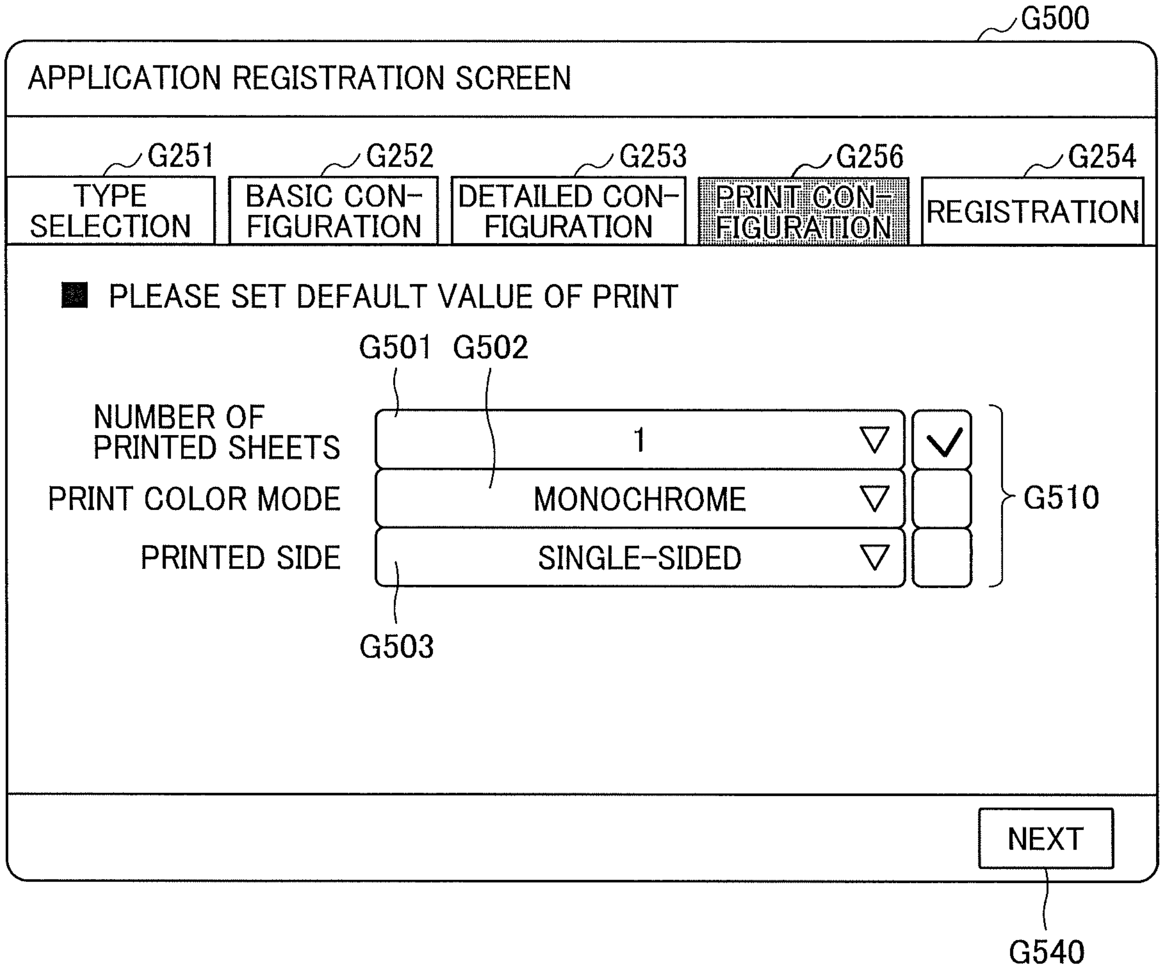
FIG. 15 illustrates an example of an application registration screen G500.

The application registration screen G500 illustrated in FIG. 15 is a screen for the administrator to perform print configuration. In FIG. 15, a print configuration tab G256 is selected. The print type or scan & print type application allows the administrator to set the default value for printing.

The application registration screen G500 illustrated in FIG. 15 includes select boxes for a number of prints configuration field G501, a print color mode configuration field G502, and a print side configuration field G503. A check box G510 is associated with each of the configuration fields.

When the administrator selects arbitrary value from the select box for each of the configuration fields, the default value for printing for the generated application is set. In the check box G510 arranged beside each of the select boxes, "check" means "changeable" from the default value, and "no check" means "unchangeable". The administrator can limit the print configuration that can be set by the user when executing the application. Therefore, it is possible to set a fixed value for each application, such as limiting the print mode to black and white.

The operation receiver 313 of the browser 310 thus accepts the registration operation for the print configuration (step S809).

When the administrator inputs an application registration operation, and the operation receiver 313 of the browser 310 accepts the application registration operation, the browser 310 generates, for example, the application configuration information 1200 illustrated in FIG. 16 (step S810).

The communicator 311 of the browser 310 transmits an application registration request to the application registration 142 of the portal service 140 (step S811). The application registration request includes the application configuration information 1200 generated in step S810.

When the application registration 142 of the portal service 140 receives the application registration request via the communicator 125, the application registration 142 transmits the registration request to the application manager 111 in the input and output service processor 110 (step S812).

When the application manager 111 in the input and output service processor 110 receives the application registration request, the application manager 111 registers the application (step S813). Then, the application manager 111 returns the registration result to the browser 310.

That is, the application manager 111 stores the application configuration information 1200 included in the application registration request in the application information storage 150 in association with the application ID. Accordingly, the application information 1000 including the application configuration information 1200, and the processing flow information 1100 having a flow name defined in a flow name 1205 of the application configuration information 1200. And then the application information 1000 is registered in the service providing system 10.

FIG. 16 illustrates an example of the application configuration information 1200 set by the administrator in FIGS. 12 to 15. The application configuration information 1200 includes bibliographic information 601 set in the type selection tab, the basic configuration tab G252, or the like, and default configuration information 602. The default configuration information 602 includes default values of scan configuration information and print configuration information set in FIGS. 14 and 15.

Figure 17:
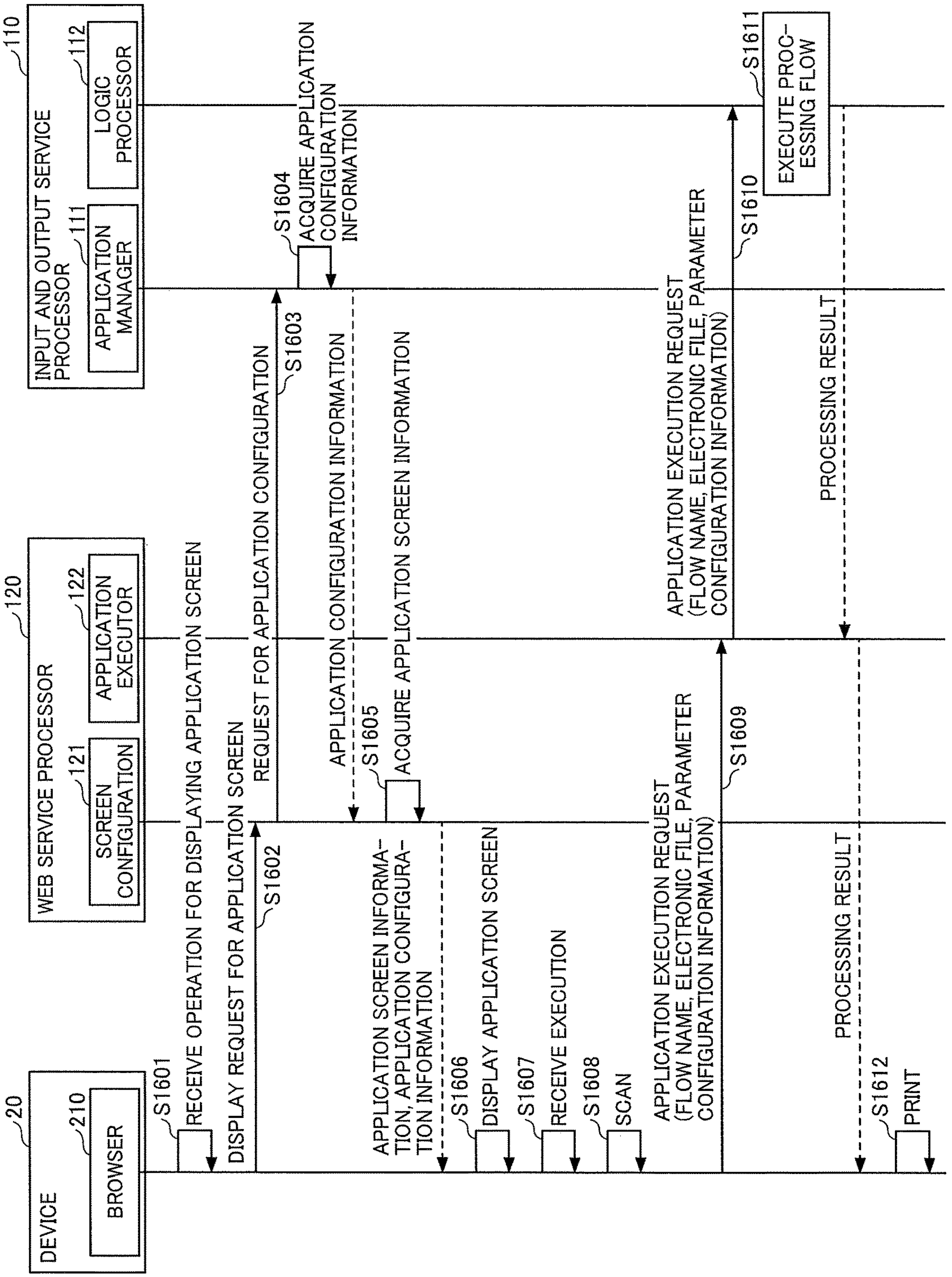
FIG. 17 is a sequence diagram illustrating an example of overall processing when a two-dimensional code printing application is executed.

A case where the administrator of the device 20 executes the "two-dimensional code print application" as an application generated by the scan & print application will be described with reference to FIG. 17. FIG. 17 is a sequence diagram illustrating an example of overall processing when the two-dimensional code printing application is executed.

The browser 210 (operation receiver 213) on the device 20 accepts an operation for displaying the two-dimensional code printing application (step S1601). The user of the device 20 can, for example, input the URL of the application screen for the two-dimensional code printing application into the address bar of the browser 310, in order to perform the display operation for the application screen.

When the browser 210 (communicator 211) on the device 20 accepts the display operation of the application screen for the two-dimensional code printing service, the browser 210 transmits a request for displaying the application screen for the two-dimensional code printing application to the screen configurator 121 of the Web service processor 120 (step S1602). The request for displaying the application screen for the two-dimensional code printing application includes the application ID for the two-dimensional code printing application.

The communicator 125 in the service providing system 10 receives the request for displaying the application screen for the two-dimensional code printing application, and the screen configurator 121 in the Web service processor 120 sends an acquisition request for the application configuration to the application manager 111 in the input and output service processor 110 (step S1603). The acquisition request for the application configuration includes the application ID for the two-dimensional code printing application.

When the application manager 111 in the input and output service processor 110 receives the acquisition request for the application configuration, the application manager 111 acquires the application configuration information 1200 memorized in association with the application ID included in the acquisition request from the application information storage 150 (step S1604). Then, the application manager 111 returns the application configuration information 1200 acquired from the application information storage 150 to the screen configurator 121.

Next, the screen configurator 121 in the Web service processor 120 acquires the application screen information 2000 memorized in association with the application ID for the two-dimensional code printing application from the application screen information storage 160 (step S1605). Then, the screen configurator 121 returns, to the browser 210, the application screen information 2000 acquired from the application screen information storage 160, and the application configuration information 1200 returned in step S1604 above.

Figure 18:
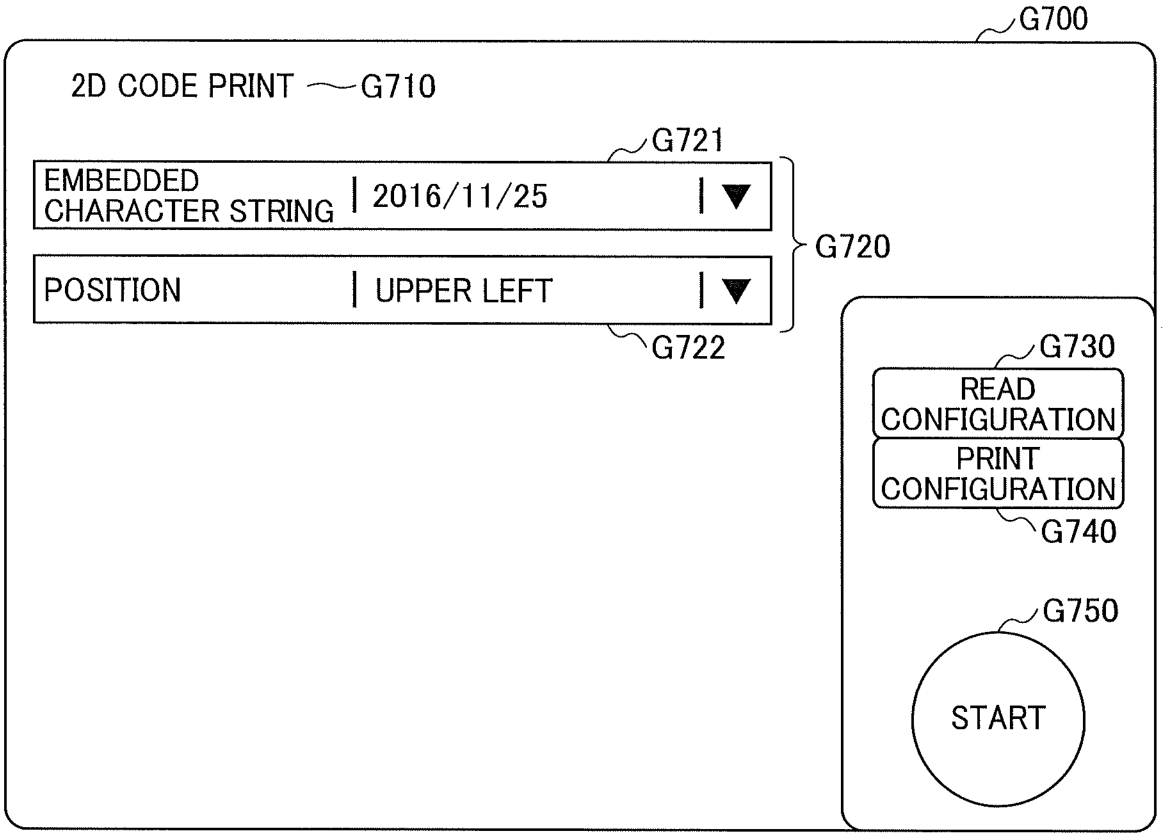
FIG. 18 is a diagram illustrating an example of an application screen.

The browser 210 (communicator 211) on the device 20 receives the application screen information 2000 and the application configuration information 1200 from the screen configurator 121, the display controller 212 displays an application screen G700 illustrated in FIG. 18, for example, based on the information 2000 and 1200 (step S1606).

The application screen G700 illustrated in FIG. 18 is a screen for the user of the device 20 to use the two-dimensional code printing application. The application is an application for the service providing system 10 to embed the two-dimensional code at the specified position in the electronic file obtained by scanning, and for the device 20 to print the result.

The application screen G700 illustrated in FIG. 18 includes an application name G710, a parameter input area G720, and a start button G750. The parameter input area G720 includes an embedded character string input field G721, and a position input field G722.

The application name G710 is displayed based on the application display name set in the basic configuration tab G252 in FIGS. 12 to 15. The user can set a character string to be included in the two-dimensional code as a parameter in the embedded character string input field G721. The user can set the "position" at which the two-dimensional code is embedded in the position input field G722.

The application screen G700 includes a read configuration button G730 and a print configuration button G740. After setting the items that the user is allowed to change the default value on the application screen G700, when the start button G750 is pressed, a series of processing from scanning to printing is executed.

Referring back to FIG. 17, the browser 210 (operation receiver 213) on the device 20 accepts the press of the start button G750 (step S1607). Then, the reading unit 230 of the device 20 controls the scanner 26 to read a document and generate an electronic file (image file) (step S1608).

When the reading unit 230 generates the electronic file (image file), the browser 210 (communicator 211) on the device 20 sends an application execution request to the application executor 122 of the Web service processor 120 (step S1609). The application execution request includes the flow name (for example, "Stamp-Print") set in the basic configuration tab G252 of FIGS. 12 to 15, the electronic file generated in step S1608, and the parameter configuration information.

The parameter configuration information may be the default value set in FIGS. 14 and 15, the parameter information set on the application screen G700 by the administrator, and the read configuration and print configuration other than the default value.

When the application executor 122 of the Web service processor 120 receives the application execution request via the communicator 125, the application executor 122 transmits the execution request to the logic processor 112 in the input and output service processor 110 (step S1610).

Next, when the logic processor 112 in the input and output service processor 110 receives the application execution request, the logic processor 112 executes the processing of the processing flow (step S1611). That is, the logic processor 112 executes a series of processing based on the processing flow information 1100 of the flow name included in the request. The details of the execution processing of the processing flow will be described below with reference to FIG. 19.

Then, the logic processor 112 returns the processing result of the execution processing of the processing flow (pdf file in which the two-dimensional code is embedded) to the browser 210 via the Web service processor 120.

As a result, the browser 210 sends the pdf file in which the two-dimensional code is embedded to the printing unit 220 in the device 20, and the printing unit 220 prints the pdf file in which the two-dimensional code is embedded (step S1612). As described above, the service providing system 10 according to the present embodiment can execute the two-dimensional code printing application.

Figure 19:
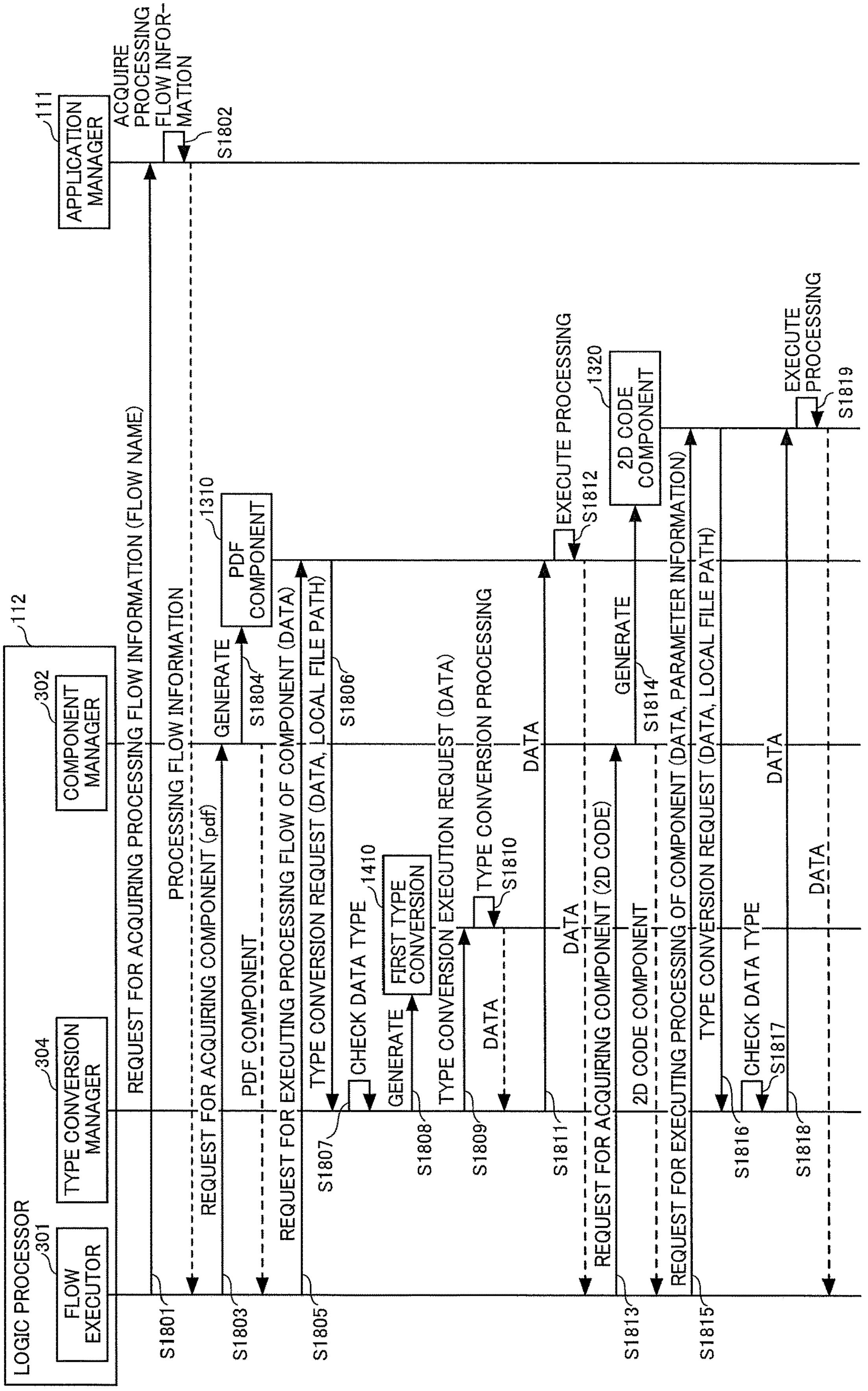
FIG. 19 is a sequence diagram illustrating an example of execution processing of the two-dimensional code printing application.

Hereinafter, the details of the execution processing of the processing flow (processing of step S1611 in FIG. 17) will be described with reference to FIG. 19. FIG. 19 is a sequence diagram illustrating an example of execution processing of the two-dimensional code printing application. In FIG. 19, it is assumed that an electronic file is converted to a PDF file and then the two-dimensional code is embedded in the PDF file.

When the flow executor 301 receives the application execution request from the application executor 122, the flow executor 301 sends a processing flow acquisition request to the application manager 111 (step S1801). The acquisition request includes the flow name "Stamp-Print".

When the application manager 111 receives the processing flow acquisition request, the application manager 111 acquires the processing flow information 1100 having the flow name "Stamp-Print" included in the acquisition request from the application information storage 150 (step S1802). Then, the application manager 111 returns the processing flow information 1100 acquired from the application information storage 150 to the flow executor 301.

Next, the flow executor 301 transmits a component acquisition request based on the processing flow information 1100 to the component manager 302 (step S1803).

That is, the flow executor 301 transmits the acquisition request for the pdf component 1310 having the component name "pdf" included in the processing flow information 1100 to the component manager 302.

When the component manager 302 receives the component acquisition request, the component manager 302 generates the component having the component name "pdf" (that is, pdf component 1310) (step S1804). The pdf component 1310 can be generated using the API for generating the component defined in the component common I/F 1300.

Then, the component manager 302 returns the generated pdf component 1310 to the flow executor 301. That is, the component manager 302 returns, for example, the address on the memory (for example, the RAM 14) in which the pdf component 1310 is developed to the flow executor 301.

Next, the flow executor 301 sends a component execution request to the pdf component 1310 (step S1805). The execution request includes data.

The data is an electronic file received from the browser 210 as the data type "InputStream". That is, the flow executor 301 transmits the electronic file received from the browser 210 to the pdf component 1310 simply as "data" (without being aware of the data type) to request execution of processing. In the present embodiment, various kinds of information such as an electronic file that is not aware of the data type are simply referred to as "data".

When the pdf component 1310 receives the component execution request, the pdf component 1310 sends a type conversion request to the type conversion manager 304 (step S1806). The type conversion request includes data and the designation of "LocalFilePath" indicating the data type that the pdf component 1310 can handle.

When the type conversion manager 304 receives the type conversion request, the type conversion manager 304 checks whether the data type of the data included in the type conversion request matches the designated data type (step S1807).

The data type of the data included in the type conversion request is "InputStream". The designated data type is "LocalFilePath". Therefore, the type conversion manager 304 determines that the data type of the data included in the type conversion request does not match the designated data type.

Then, the type conversion manager 304 identifies the type conversion for converting the data type "InputStream" into "LocalFilePath" by referring to the type conversion information table 4000 (here, the first type conversion 1410 is identified). Then, the type conversion manager 304 generates the identified first type conversion 1410 (step S1808). The first type conversion 1410 can be generated using the type conversion common I/F 1400.

Next, the type conversion manager 304 sends an execution request for the type conversion processing to the first type conversion 1410 (step S1809). The execution request includes data.

When the first type conversion 1410 receives the type conversion execution request, the first type conversion 1410 performs a type conversion processing for converting the data type of the data included in the execution request from "InputStream" to "LocalFilePath" (step S1810). Then, the first type conversion 1410 returns the data whose data type has been converted to the type conversion manager 304.

Then, when the type conversion manager 304 receives the data from the first type conversion 1410, the type conversion manager 304 sends the data to the pdf component 1310 (step S1811).

When the pdf component 1310 receives the data from the type conversion manager 304, the pdf component 1310 executes processing on the data (step S1812). That is, the pdf component 1310 uses the pdf processor 131 to convert the electronic file indicated by the data into a pdf.

Then, the pdf component 1310 returns the data indicating the electronic file after the pdf conversion processing (that is, the pdf file) to the flow executor 301.

Next, the flow executor 301 transmits a component acquisition request based on the processing flow information 1100 to the component manager 302 (step S1813). That is, the flow executor 301 transmits, to the component manager 302, the acquisition request for the two-dimensional code component 1320 having the component name "two-dimensional code" included in the processing flow information 1100.

When the component manager 302 receives the component acquisition request, the component manager 302 generates the component having the component name "two-dimensional code" (that is, the two-dimensional code component 1320) (step S1814). The two-dimensional code component 1320 can be generated using the API for generating the component defined in the component common I/F 1300.

Then, the component manager 302 returns the generated two-dimensional code component 1320 to the flow executor 301. That is, the component manager 302 returns the address on the memory (for example, the RAM 14) where the two-dimensional code component 1320 is developed, to the flow executor 301, for example.

Next, the flow executor 301 sends a component execution request to the two-dimensional code component 1320 (step S1815). The execution request includes data and parameter information.

The data is the data returned from the two-dimensional code component 1320 (that is, the path indicating the pdf file with the two-dimensional code).

The parameter information is the information indicating the character string included in the two-dimensional code set in FIG. 18, and the "position" for embedding the two-dimensional code.

When the two-dimensional code component 1320 receives the component execution request, the two-dimensional code component 1320 sends a type conversion request to the type conversion manager 304 (step S1816). The type conversion request includes data and the designation of "LocalFilePath" indicating a data type that can be handled by the two-dimensional code component 1320.

When the type conversion manager 304 receives the type conversion request, the type conversion manager 304 checks whether the data type of the data included in the type conversion request matches the designated data type (step S1817).

The data type of the data included in the type conversion request is "LocalFilePath". The designated data type is also "LocalFilePath". Therefore, the type conversion manager 304 determines that the data type of the data included in the type conversion request matches the designated data type.

Then, the type conversion manager 304 sends the data included in the type conversion request to the pdf component 1310 (step S1818). Thus, in the data type check (process of step S1817), when the type conversion manager 304 determines that the data type of the data matches the designated data type, the type conversion manager 304 does not generate the type conversion.

When the pdf component 1310 receives the data from the type conversion manager 304, the pdf component 1310 uses the parameter information to perform processing on the data (step S1819). That is, the pdf component 1310 converts the character string included in the parameter information into a two-dimensional code, and embeds (forms) the two-dimensional code in the position included in the parameter information.

Then, the pdf component 1310 returns the data indicating the pdf file in which the two-dimensional code is embedded to the flow executor 301.

The flow executor 301 sends the pdf file in which the two-dimensional code is embedded to the device 20 via the Web service processor 120.

In the following, the service providing system 10 which can notify an error during execution of the processing flow will be described.

The administrator can set the error notification condition on the application registration screens G200, G300, G400, and G500 in FIGS. 12 to 15. The administrator selects a component on the processing flow, and sets an error notification condition.

Figure 20:
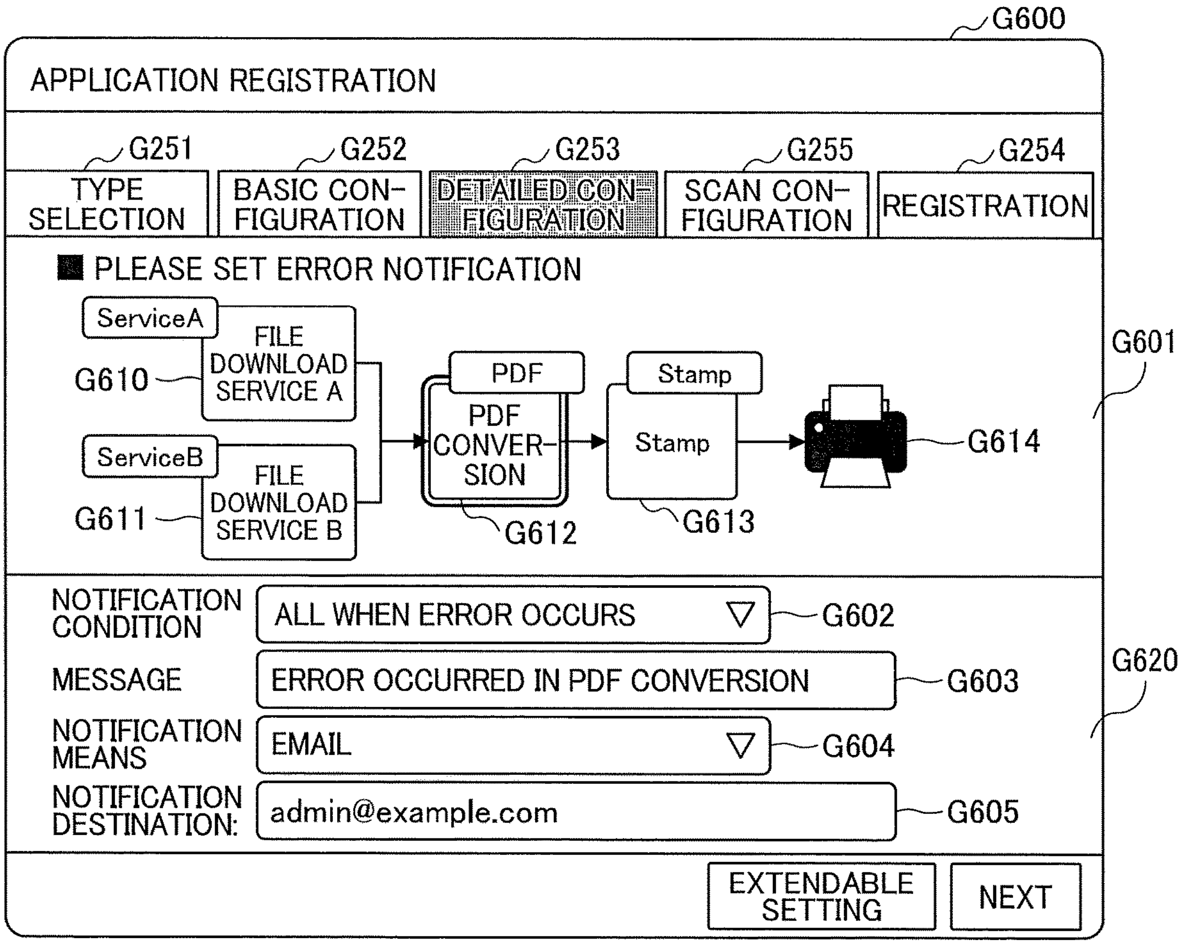
FIG. 20 is a diagram illustrating a configuration example of an application registration screen capable of notifying an error of the two-dimensional code printing application on the application registration screen.

FIG. 20 illustrates a configuration example of an application registration screen G600 capable of notifying an error of the two-dimensional code printing application on the application registration screen. The application registration screen G600 includes a processing flow configuration field G601. The processing flow configuration field G601 displays each processing in the order of the processing by icons. The two-dimensional code printing application includes an icon G610 indicating a "file download service A" component that downloads a file from service A, an icon G611 indicating a "file download service B" component for downloading a file from service B, an icon G612 indicating a PDF component for converting an electronic file into a PDF file, an icon G613 indicating a two-dimensional code component for embedding a two-dimensional code in a PDF file, and an icon G614 representing the device 20, as described above.

The application registration screen G600 includes an error notification configuration field G620. The error notification configuration field G620 includes a notification condition configuration field G602, a message configuration field G603, a notification means configuration field G604, and a notification destination configuration field G605, and the administrator performs notification configuration for an error occurrence. The example of FIG. 20 is an example of the error notification configuration of the "PDF component".

The notification condition configuration field G602 is a select box in which a notification condition for determining whether to notify is selectable. In the notification condition configuration field G602, the following can be selected:

1) All when an error occurs;
2) When an error occurs in a specific file (for example, when file type is invalid or file contains a virus);
3) When an error occurs in a specific parameter or combination of parameters (for example, when setting is a combination that cannot be configured); and
4) A case that an error occurs on a specific route will be described with reference to FIG. 21.

The message configuration field G603 is a select box in which the administrator can arbitrarily set a massage to be notified.

The notification means configuration field G604 is a select box in which the medium to be notified can be selected.

In the notification means configuration field G604, the following can be selected:

1) Mail; 2) SNS; and 3) Chat.

The notification destination configuration field G605 is a select box indicating a destination such as a mail address or an SNS group name.

The information regarding the set error notification is transmitted to the service providing system 10, and stored in the application configuration information 1200. The error notification configuration field G620 is similarly displayed for each component. The administrator may set an error notification for each component.

Figure 21:
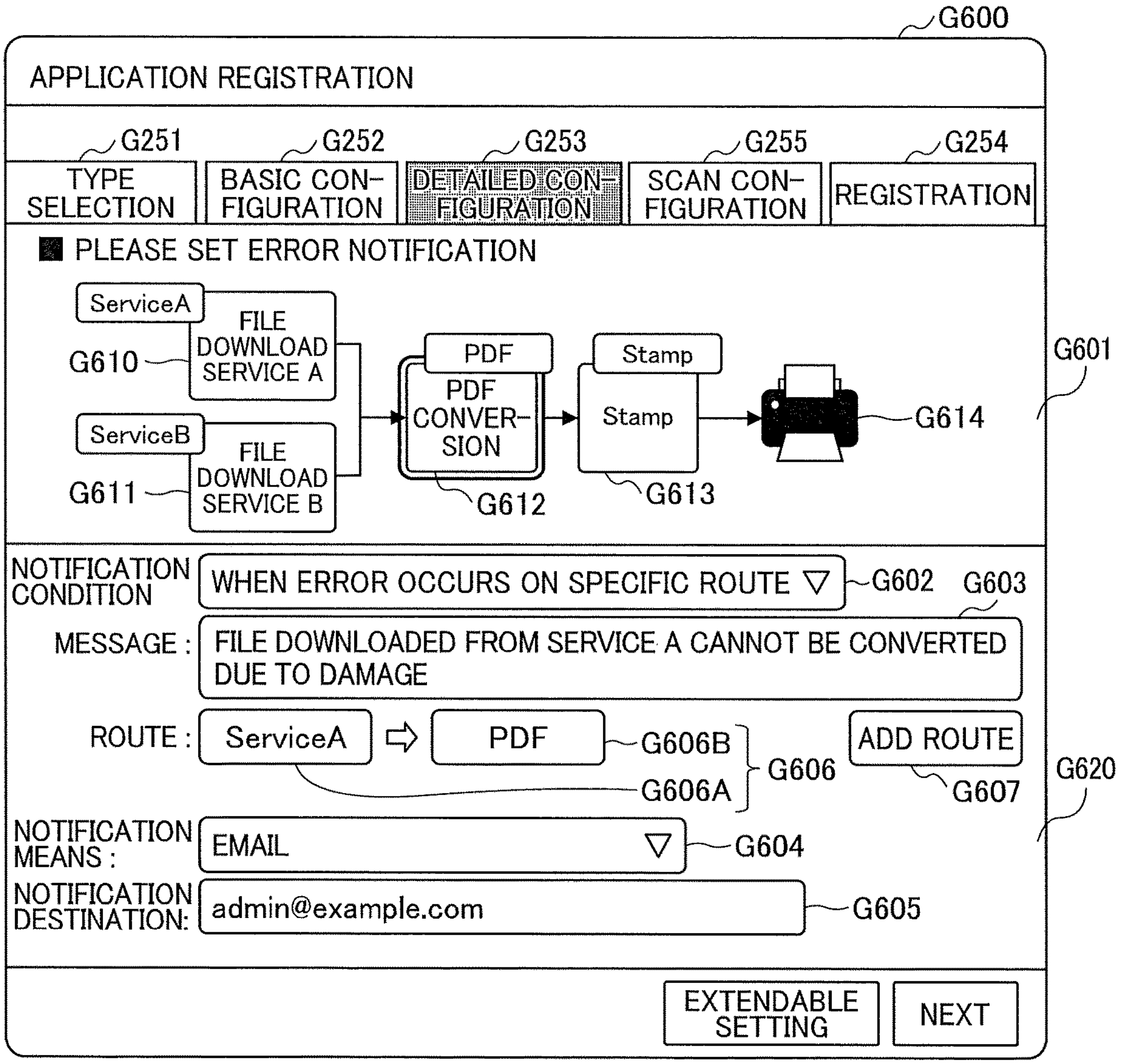
FIG. 21 is a diagram illustrating an example of a configuration when an error occurs in a specific route on the application registration screen.

FIG. 21 is a diagram illustrating a configuration example when an error occurs in a specific route on the application registration screen G600. The application registration screen G600 of FIG. 21 includes a route configuration field G606 and a route addition button G607. The route configuration field G606 is displayed when "when an error occurs in a specific route" is selected in the notification condition configuration field G602.

The route configuration field G606 includes a starting point processing field G606A and an ending point processing field G606B for the route. The administrator can set the starting point processing and the ending point processing by dragging one the icons in the processing flow configuration field G601 to the starting point processing field G606A and the ending point processing field G606B, respectively. In FIG. 21, the user has the specified route from the file download service A to the PDF conversion. The administrator sets a message when an error occurs in the route in the message configuration field G603. In FIG. 21, the message "The file downloaded from the file download service A is corrupted and cannot be converted" is input. The name of the processing set in the starting point processing field G606A and the ending point processing field G606B or the message using the name may be automatically displayed in the message configuration field G603.

The administrator can press the route addition button G607 to add the route configuration field G606, and display the added route configuration field G606. Therefore, the administrator can set an arbitrary specific route in the starting point processing field G606A and the ending point processing field G606B.

When an error occurs in the processing that has passed through the route set in the route configuration field G606, the flow executor 301 sends a message to the notification destination set in the notification destination configuration field G605.

Figure 22A:
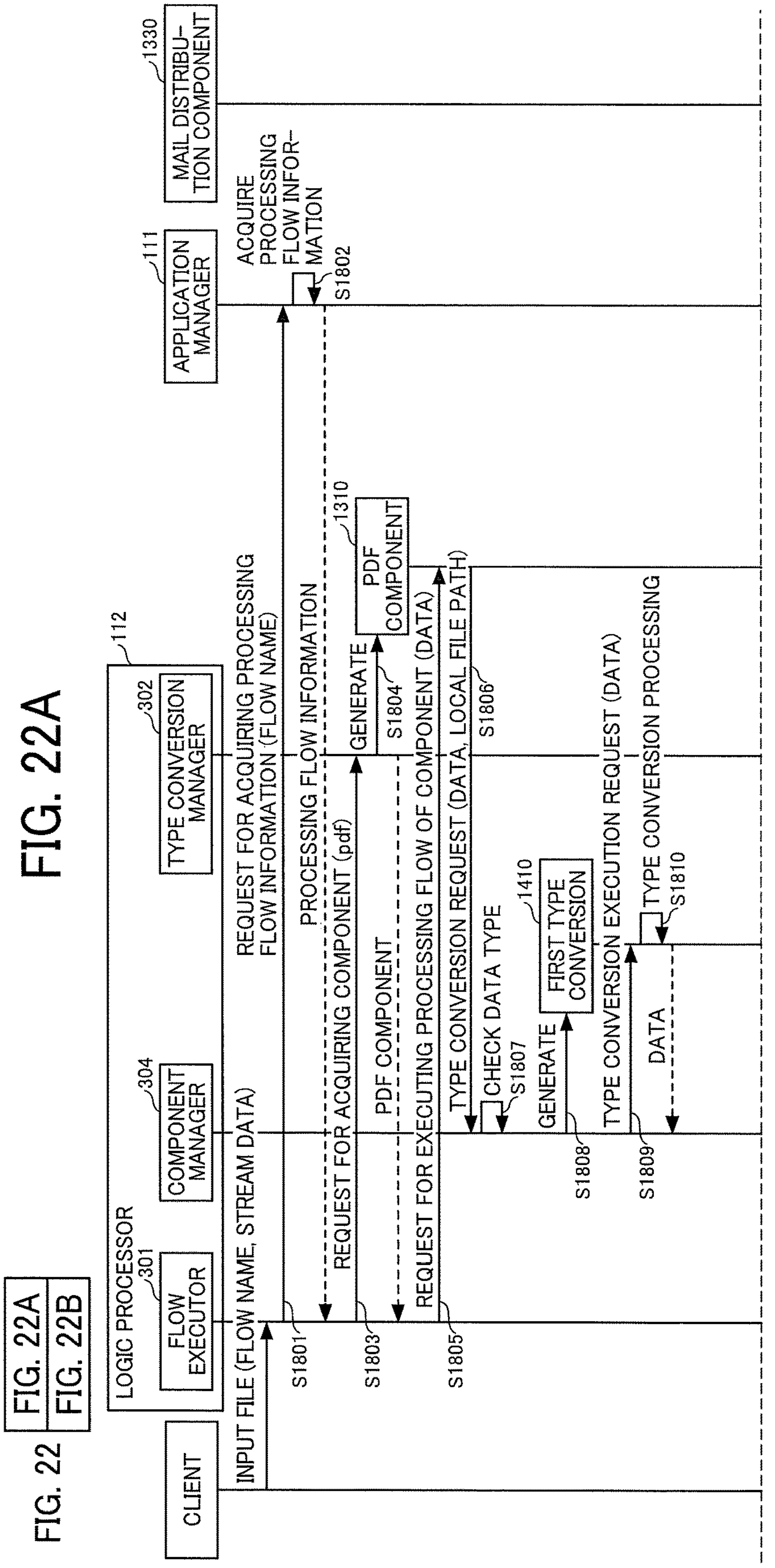
FIGS. 22A and 22B (FIG. 22) are a sequence diagram illustrating an example of execution processing of the two-dimensional code printing application corresponding to an error notification.
Figure 22B:
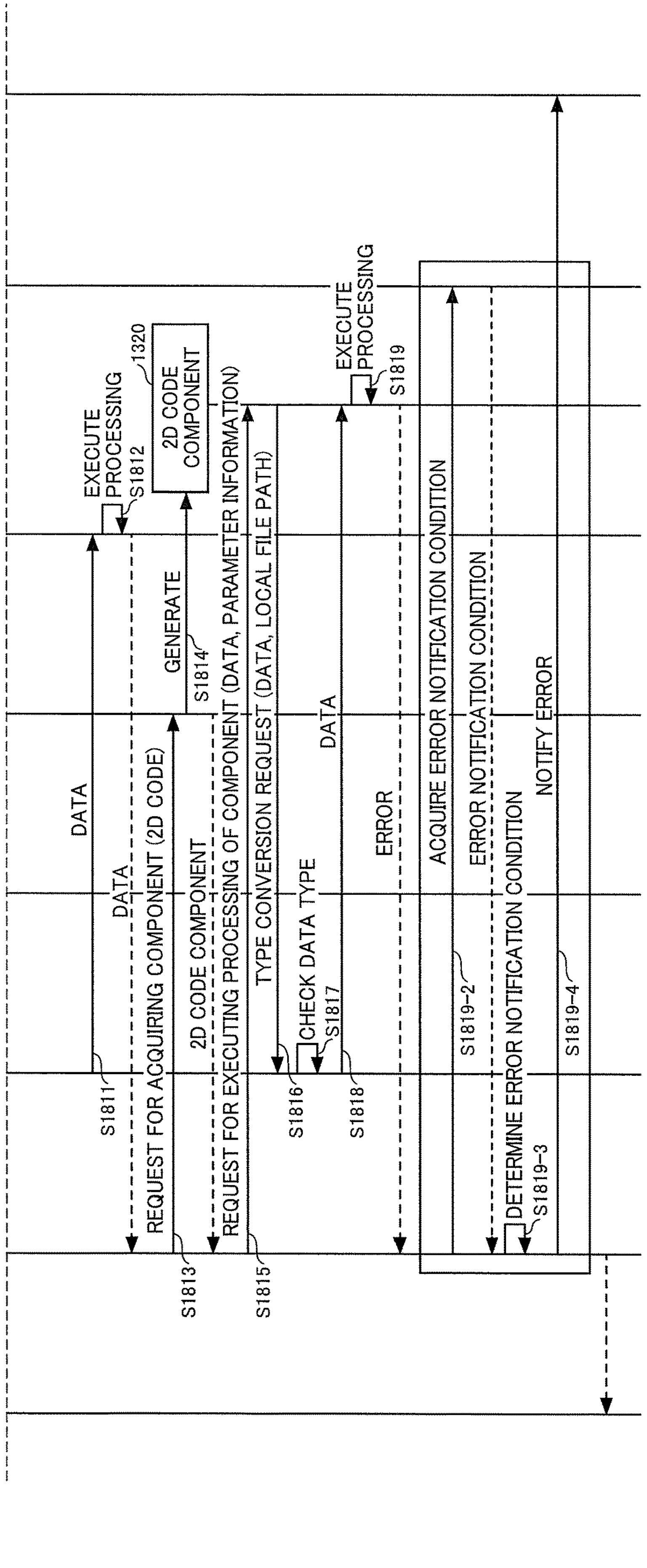

Processing of the logic processor 112 when an error occurs will be described with reference to FIG. 22. FIG. 22 is a sequence diagram illustrating an example of execution processing of a two-dimensional code printing application corresponding to an error notification. The difference between FIG. 22 and FIG. 19 will be described.

The processing from steps S1801 to S1819 in FIG. 22 is the same as the processing in FIG. 19. However, in step S1819, it is assumed that "an error has occurred". The fact that "an error has occurred" is notified to the flow executor 301. The notification that an error has occurred informs what kind of error has occurred. Therefore, the flow executor 301 can determine whether the set notification condition is met. The route of the processing flow is determined by the recorded log.

The flow executor 301 specifies the application ID for the two-dimensional code printing application, and acquires the error notification condition registered in the two-dimensional code printing application for the application manager 111 (S1819-2).

The flow executor 301 determines whether the acquired error notification condition matches the generated error (S1819-3). Details of the determination will be described with reference to FIGS. 23 to 26.

When the error notification condition matches the generated error, the flow executor 301 notifies the error (S1819-4). In the example of FIG. 22, since the notification means is mail, the flow executor 301 requests the "mail service" for the mail notification.

The determination method will be described with reference to FIG. 23. FIG. 23 is an example of an error notification configuration table that stores information set in the error notification configuration field G620 on the application registration screen G600. The error notification configuration is registered for each application based on the configuration content in the error notification configuration field G620. That is, in the error notification configuration table (an example of error notification configuration information), items for target application, notification condition, error notification condition determination information, message, notification means, notification destination, target component identifier, and priority are associated with one another.

The target application, the notification condition, the message, the notification means, the notification destination, and the target component identifier are the contents set by the administrator. The priority defines the order for determining the presence or absence of a processing error.

The application manager 111 generates the error notification condition determination information based on the notification condition. For example, when the notification condition is a specific file and the administrator specifies the ZIP file, the error notification condition determination information is "extension: zip" (the extension is ZIP). That is, the administrator presets a file type that cannot be input to a component by an extension or the like. Alternatively, the administrator may also set a file containing a virus as the specific file. The content of the error notified by the component in the application includes a file type and a virus check result. Therefore, the flow executor 301 can determine whether the notification condition matches the error content.

When the notification condition results in an error with a specific parameter or combination of parameters, and the administrator sets a notification condition by specifying a file with the type indicating "docx" in an electronic file in which Japanese is specified as a specific setting, the error notification condition determination information is as follows:

""key": "language" "value": "japanese",
"key": "filetype" "value": "docx""

That is, the administrator presets a combination of parameters that cannot be processed by a component with the parameter name in the error notification configuration field G620. The combination here is a combination of parameters whose language and file type cannot be processed by a component included in an application. When an error occurs due to a combination of parameters that cannot be processed, the error content that a component notifies the flow executor 301 includes a specific combination of parameters that cannot be processed. Therefore, the flow executor 301 can determine whether the notification condition matches the error content.

The administrator may set a specific parameter as the notification condition instead of a specific combination of parameters.

When the notification condition is a specific route and the administrator sets the route of the service B and the PDF as the specific route for processing, the error notification condition determination information is ""route": "ServiceB", "PDF"".

The error notification condition determination information can be set by the administrator. Further, the error notification condition determination information can be customized by the user.

The following log file is necessary for the flow executor 301 to determine whether the route is correct.

FIG. 24 is an example of a log file recorded when a processing flow is executed. The log file stores component name (processing name), status, or the like in the order in which the components included in a processing flow are executed. That is, the log file records the processing route.

According to FIG. 24, the description 1 describes the execution result of the component corresponding to the download from the service B, and the description 2 records the execution result of the component corresponding to the PDF conversion. Therefore, it is understood that the PDF conversion is executed after the service B, and an error has occurred in the PDF conversion.

The error notification condition determination information is set such that the execution order is from the service B to the PDF conversion. Therefore, the flow executor 301 compares the log file with the route of the error notification condition determination information, and determines that the notification condition is met. When the flow executor 301 determines that the notification condition is met, the flow executor 301 sends an error notification to the notification destination of the notification means associated with the notification condition.

The flow executor 301 includes a judgment logic for each error notification condition, and determines whether the condition is met by passing the error notification condition determination information to the judgment logic. The flow executor 301 sequentially determines the notification condition having the next highest priority, regardless of whether the error content matches the notification condition.

As described above, since an error can be notified in association with a component, it is possible to detect and notify that an error has occurred in the specific processing (timing). By setting the type of the file and the result of the virus check in the notification condition, it is possible to detect and notify that an error has occurred in a specific file. By setting the specific combination of parameters in the notification condition, it is possible to detect and notify that an error has occurred in a specific combination. By setting the route in the notification condition, it is possible to detect and notify that an error has occurred in a specific route.

As illustrated in FIGS. 25 and 26, the information set in the error notification configuration table includes various variations.

FIG. 25 illustrates an example of an error notification configuration table in which "self" is set as one of the notification destinations. When "self" is registered as the notification destination, the flow executor 301 can notify the user who has executed. "Self" indicates the user himself, and an error can be notified to the user who has executed the application by referring to the destination (mail address, SNS, chat, etc.) included in the user information associated with the user who has logged in to the service providing system 10.

FIG. 26 illustrates an example of an error notification configuration table for issuing an error notification based on the error that has occurred. The item "target error code" is set as a new item. The target error code indicates the type of the error code. As an example, "forbidden" means an access authority error. Also, set is the configuration for notifying a message that an unauthorized user is trying to access a file when the access authority error occurs. Therefore, it is possible to notify an error according to the error type that has occurred.

The information regarding the user authority is notified to the component, and the component determines whether the user has the authority to perform the processing. The target error code is notified from the component to the flow executor 301.

As described above, the information processing system according to the present embodiment allows the administrator to set the error notification condition for each processing. Further, since the information processing system according to the present embodiment can set the detailed notification condition, it is possible to perform the detailed notification in accordance with the occurrence of the error.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in the present embodiment, the two-dimensional code printing application has been described as an example. However, any application that notifies an error may be used.

In the present embodiment, the image forming device has been mainly described as the device 20. However, the device that executes the application is not limited to the image forming device. For example, the device 20 may be, for example, a projector (PJ), an interactive white board (IWB: white board having an electronic blackboard function capable of mutual communication), or a video conference terminal.

The configuration examples of FIGS. 6 and 7 are divided according to the main functions in order to facilitate understanding of the processing by the service providing system 10. The present invention is not limited by the method or name for dividing the processing unit. The processing of the service providing system 10 can be divided into more processing units according to the processing content. It is also possible to divide the processing of the service providing system 10 such that one processing unit includes more processing.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system comprising:
- a device including first circuitry; and
- a service providing server communicably connected with the device via t network, including second circuitry;
- the first circuitry being configured to transmit an execution request for executing a processing flow to the service providing server, the processing flow defining an execution order of a plurality of processing to be executed by the service providing server; and
- the second circuitry being configured to:
  - in response to the execution request for the processing flow, execute at least one component for executing a particular processing of the plurality of processing in the processing flow; and
  - in case that an error occurs in execution of the particular processing by the component, refer to error notification configuration information associating an error notification condition with each processing included in the processing flow, the error notification condition being different for each processing, and report that the error has occurred based on an error notification condition associated with the particular processing.

2. The information processing system according to claim 1,
- wherein the error notification configuration information further sets a plurality of processing routes included in the processing flow, and
- in case that the error occurs in execution of the particular processing by the component, the second circuitry determines whether a route for the plurality of processing set in the error notification configuration information matches the plurality of processing executed in the processing flow recorded in a log file, and reports that the error has occurred in a specific route when the route for the plurality of processing set in the error notification configuration information matches the plurality of processing executed in the processing flow recorded in the log file.

3. The information processing system according to claim 1,
- wherein the error notification configuration information further sets a specific file type of an electronic while that cannot be input to the component that executes the processing, and
- in case that the error occurs in execution of the particular processing by the component, the second circuitry compares the specific file type set in the error notification configuration information with content of the error, reports that the error has occurred due to the specific file type based on a determination that the specific file type matches the content of the error.

4. The information processing system according to claim 1,
- wherein the error notification configuration information sets a combination of parameters that cannot be processed by the component that executes the particular processing, and
- in case that the error occurs in execution of the particular processing by the component, the second circuitry compares the combination of parameters set in the error notification configuration information with content of the error, and reports that the error has occurred due to the specific combination of parameters based on a deteitnination that the combination of parameters set in the error notification configuration information matches the content of the error.

5. The information processing system according to claim 1,
- wherein the error notification configuration information sets a notification destination for each of the processing, in addition to the error notification condition,
- in case that the error occurs in execution of the particular processing by the component, the second circuitry reports to a user who has logged into the information processing system at a destination specified by the user based on a determination that the user is set as the notification destination.

6. The information processing system according to claim 1,
- wherein the error notification configuration information sets an error code for each of the processing, in addition to the error notification condition,
- in case that the error occurs in execution of the particular processing by the component, the second circuitry compares the error code set in the error notification configuration information with content of the error, and reports that the error has occurred based on a determination that the error code set in the error notification configuration information matches the content of the error.

7. The information processing system according to claim 6, wherein the error code indicates that an unauthorized user has accessed a file, and the second circuitry reports that an unauthorized user has accessed a file based on the determination that the error code set in the error notification configuration information matches the content of the error.

8. The information processing system according to claim 1, further comprising an information processing device configured to communicate with the service providing server, comprising third circuitry configured to:

display icons for each processing included in the processing flow in the order of the processing, based on screen information received from the service providing server; and receive the error notification condition with respect to a selection of an icon from the icons and the processing corresponding to the selected icon, wherein the first circuitry transmits the error notification condition for each of the received processing to the service providing server.

9. A processing execution method performed by a service providing server configured to communicate with a device via a network, the method comprising:

receiving, from the device, an execution request for executing a processing flow defining an execution order of a plurality of processing to be executed by the service providing server;

executing at least one component for executing a particular processing of the plurality of processing in the processing flow; and in case that an error occurs in execution of the particular processing by the component, the method further comprising:

referring to error notification configuration information associating an error notification condition with each processing included in the processing flow, the error notification condition being different for each processing; and reporting that the error has occurred based on an error notification condition associated with the particular processing.

10. A service providing system communicably connected with a device via a network, the service providing system comprising circuitry configured to:

receive, from the device, an execution request for executing a processing flow defining an execution order of a plurality of processing to be executed by the service providing system;

execute at least one component for executing a particular processing of the plurality of processing in the processing flow; and in case that an error occurs in execution of the particular processing by the component, refer to error notification configuration information associating an error notification condition with each processing included in the processing flow, the error notification condition being different for each processing, and report that the error has occurred based on an error notification condition associated with the particular processing.

* * * * *